(12) United States Patent
Zhou et al.

(10) Patent No.: US 11,050,918 B2
(45) Date of Patent: Jun. 29, 2021

(54) METHOD AND APPARATUS FOR PERFORMING IMAGE PROCESSING, AND COMPUTER READABLE STORAGE MEDIUM

(71) Applicant: GUANGDONG OPPO MOBILE TELECOMMUNICATIONS CORP., LTD., Guangdong (CN)

(72) Inventors: Haitao Zhou, Guangdong (CN); Guohui Tan, Guangdong (CN); Ziqing Guo, Guangdong (CN); Xiao Tan, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/743,533

(22) Filed: Jan. 15, 2020

(65) Prior Publication Data
US 2020/0154033 A1    May 14, 2020

Related U.S. Application Data

(63) Continuation of application No. PCT/CN2019/083854, filed on Apr. 23, 2019.

(30) Foreign Application Priority Data

Apr. 28, 2018 (CN) .......................... 201810401326.3
Apr. 28, 2018 (CN) .......................... 201810402998.6
Apr. 28, 2018 (CN) .......................... 201810402999.0

(51) Int. Cl.
*H04N 7/18* (2006.01)
*H04N 5/232* (2006.01)
(Continued)

(52) U.S. Cl.
CPC ......... *H04N 5/23203* (2013.01); *G06T 7/521* (2017.01); *G06T 17/00* (2013.01)

(58) Field of Classification Search
CPC ....... H04N 5/23203; H04N 2013/0081; H04N 5/33; H04N 5/232; G06T 7/521;
(Continued)

(56) References Cited

U.S. PATENT DOCUMENTS

2003/0031188 A1* 2/2003 Ishibashi ............... H04L 67/306
                                                                      370/400
2014/0204385 A1* 7/2014 Ouyang ................. G01N 21/47
                                                                      356/445
(Continued)

FOREIGN PATENT DOCUMENTS

CN        102438111 A        5/2012
CN        102622591 A        8/2012
(Continued)

OTHER PUBLICATIONS

Afzal et al, 3D face reconstruction from single 2D image using distinctive features (Year: 2020).*

(Continued)

Primary Examiner — Shan E Elahi

(57) ABSTRACT

A method and an apparatus for processing data, and a computer readable storage medium. The method includes: turning on at least one of a floodlight or a laser light, and operating a laser camera to collect a target image in response to a first processing unit receiving an image collection instruction sent by a second processing unit; and performing processing on the target image via the first processing unit, and sending the target image processed to the second processing unit.

19 Claims, 13 Drawing Sheets

(51) Int. Cl.
*G06T 7/521* (2017.01)
*G06T 17/00* (2006.01)

(58) Field of Classification Search
CPC .......... G06T 17/00; G06T 2207/30201; G06K 9/00288; G06K 9/2036; G06K 9/00201; G06K 9/00255; G01B 5/0014; G01B 11/2513; H05B 47/18; H05B 47/10
USPC .......................................................... 348/46
See application file for complete search history.

(56) References Cited

U.S. PATENT DOCUMENTS

| | | | |
|---|---|---|---|
| 2015/0085075 | A1 | 3/2015 | Hudman et al. |
| 2016/0240057 | A1* | 8/2016 | Galburt ................ G08B 29/183 |
| 2016/0341829 | A1 | 11/2016 | Hudman et al. |
| 2017/0034456 | A1 | 2/2017 | Kyung et al. |
| 2018/0017380 | A1* | 1/2018 | Sugimura ................ G06T 7/74 |
| 2018/0059225 | A1* | 3/2018 | Zhu ........................ G01S 17/86 |
| 2018/0061056 | A1 | 3/2018 | Zhao et al. |
| 2018/0303667 | A1* | 10/2018 | Peyman ................ A61B 34/35 |
| 2019/0084089 | A1* | 3/2019 | Igasaki .................... G02B 5/08 |
| 2019/0265646 | A1* | 8/2019 | Falkenberg ............ G02B 30/26 |
| 2019/0295271 | A1* | 9/2019 | Xu ..................... G06K 9/00275 |

FOREIGN PATENT DOCUMENTS

| | | | |
|---|---|---|---|
| CN | 102970548 | A | 3/2013 |
| CN | 103139331 | A | 6/2013 |
| CN | 103971405 | A | 8/2014 |
| CN | 105407610 | A | 3/2016 |
| CN | 105513221 | A | 4/2016 |
| CN | 106331453 | A | 1/2017 |
| CN | 106454287 | A | 2/2017 |
| CN | 106851927 | A | 6/2017 |
| CN | 106973251 | A | 7/2017 |
| CN | 107105217 | A | 8/2017 |
| CN | 107169483 | A | 9/2017 |
| CN | 107341481 | A | 11/2017 |
| CN | 107370966 | A | 11/2017 |
| CN | 107371017 | A | 11/2017 |
| CN | 107424187 | A | 12/2017 |
| CN | 107450591 | A | 12/2017 |
| CN | 107749949 | A | 3/2018 |
| CN | 107944422 | A | 4/2018 |
| CN | 108564032 | A | 9/2018 |
| CN | 108573170 | A | 9/2018 |
| CN | 108696682 | A | 10/2018 |
| CN | 108810516 | A | 11/2018 |
| CN | 108833887 | A | 11/2018 |
| CN | 108696682 | B | 7/2019 |
| JP | 2009262344 | A | 11/2009 |

OTHER PUBLICATIONS

Notice of Allowance of CN application 201810402998.6_withTranslation dated Apr. 7, 2020.
First OA for CN application 201910492085.2_withTranslation dated Jun. 28, 2020.
Second OA for CN application 201810401326.3_withTranslation.
Second OA for CN application 201810401326.3_withTranslation dated Apr. 17, 2020.
Chinese Office Action with English Translation for Application No. 201810401326.3 dated Oct. 23, 2020.
European Office Action for Application No. 19792981.3 dated Sep. 15, 2020.
Office Action with English translation for CN application 201810402998.6.
Office Action with English Translation for CN application 201810402999.0.
ISR with English Translation for PCT application PCT/CN2019/083854.
Office Action with English Translation for CN application 201810401326.3.
China Second Office Action with English Translation for CN Application 201910492085.2 dated Feb. 3, 2021. (9 pages).

\* cited by examiner in response to a first processing unit receiving an image collection instruction sent by a second processing unit, turning on at least one of a floodlight and a laser light, and operating a laser camera to collect a target image ~ 001 performing processing on the target image via the first processing unit, and sending the target image processed to the second processing unit ~ 002

FIG. 1 in response to the first processing unit receiving the image collection instruction sent by the second processing unit, sending a control instruction to a controller via an inter-integrated circuit (I2C) bus, the control instruction being configured to turn on the at least one of the floodlight and the laser light ~ 011 sending an impulse to the controller via a pulse width modulation (PWM) module to illustrate the at least one of the floodlight and the laser light being turned up, and collecting the target image via the laser camera ~ 012 performing processing on the target image via the first processing unit, and sending the target image processed to the second processing unit ~ 002

FIG. 2 collecting a temperature of the laser light in a collection time interval, and obtaining a reference speckle image corresponding to the temperature via the second processing unit — 0351 writing the reference speckle image obtained at a present time to the first processing unit via the second processing unit when the reference speckle image obtained at the present time is inconsistent with the reference speckle image stored in the first processing unit — 0352

FIG. 17

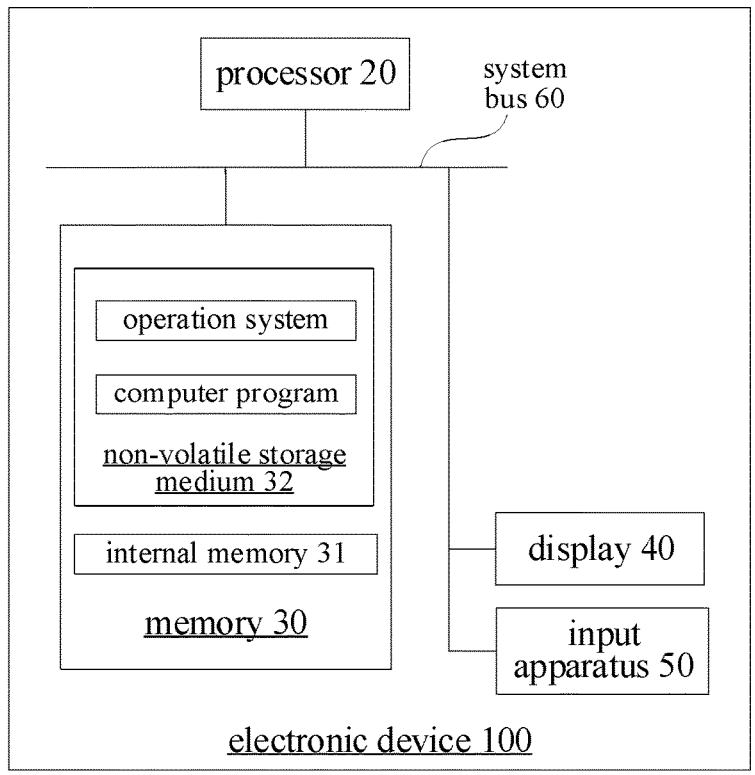

FIG. 18

METHOD AND APPARATUS FOR PERFORMING IMAGE PROCESSING, AND COMPUTER READABLE STORAGE MEDIUM

CROSS-REFERENCE TO RELATED APPLICATION(S)

This application is a continuation application of PCT application No. PCT/CN2019/083854, filed on Apr. 23, 2019, which claims priority to Chinese Patent Application Nos. 201810402998.6, 201810402999.0 and 201810401326.3, all filed on Apr. 28, 2018, the entire contents of all of which are incorporated herein by reference in their entireties.

TECHNICAL FIELD

Embodiments of the present disclosure relate to a field of computer technology, and more particularly to a method for processing data, an apparatus for processing data, and a computer readable storage medium.

BACKGROUND 3D (three dimensions) face plays an important role in different application scenarios such as face recognition, image optimization, and 3D modeling and the like. An electronic device may emit laser via a laser light or the like, collect a face image illuminated by the laser via a camera, and structure the 3D face via structure light. In a conventional manner, it is complicated and has a high cost that the electronic device controls a control circuit such as the laser, the camera and the like.

SUMMARY

Implementations of the present disclosure provide a method for processing data, an apparatus for processing data, and a computer readable storage medium.

The method for processing data of implementations of the present disclosure includes: turning on at least one of a floodlight and a laser light and operating a laser camera to collect a target image in response to a first processing unit receiving an image collection instruction sent by a second processing unit; and performing processing on the target image via the first processing unit, and sending the target image processed to the second processing unit.

The apparatus for processing data of implementations of the present disclosure includes: one or more processors, a memory storing instructions executable by the one or more processors, in which the one or more processors are configured to: turning on at least one of a floodlight and a laser light and operating a laser camera to collect a target image in response to a first processing unit receiving an image collection instruction sent by a second processing unit; perform processing on the target image via the first processing unit, and send the target image processed to the second processing unit.

The computer readable storage medium of implementations of the present disclosure has a computer program stored thereon. The computer program is configured to implement a method for processing data described in an embodiment of the present disclosure when executed by a processor. The method includes: turning on at least one of a floodlight and a laser light and operating a laser camera to collect a target image in response to a first processing unit receiving an image collection instruction sent by a second processing unit; and performing processing on the target image via the first processing unit, and sending the target image processed to the second processing unit.

Additional aspects and advantages of implementation of the present disclosure will partly be presented in the following description, partly become apparent in the following description or be appreciated in practicing of the present disclosure.

BRIEF DESCRIPTION OF DRAWINGS

The above and other aspects and advantages of the present disclosure will become more apparent and easier with reference to descriptions of the following accompanying drawings the implementations, in which:

FIG. 1 and FIG. 2 are flow charts illustrating methods for processing data of one or more implementations of the present disclosure.

FIG. 16-FIG. 17 are flow charts illustrating methods for processing data of one or more implementations of the present disclosure.

FIG. 18 is a block diagram illustrating an electronic device of one or more implementations of the present disclosure.

DETAILED DESCRIPTION

Figure 3:
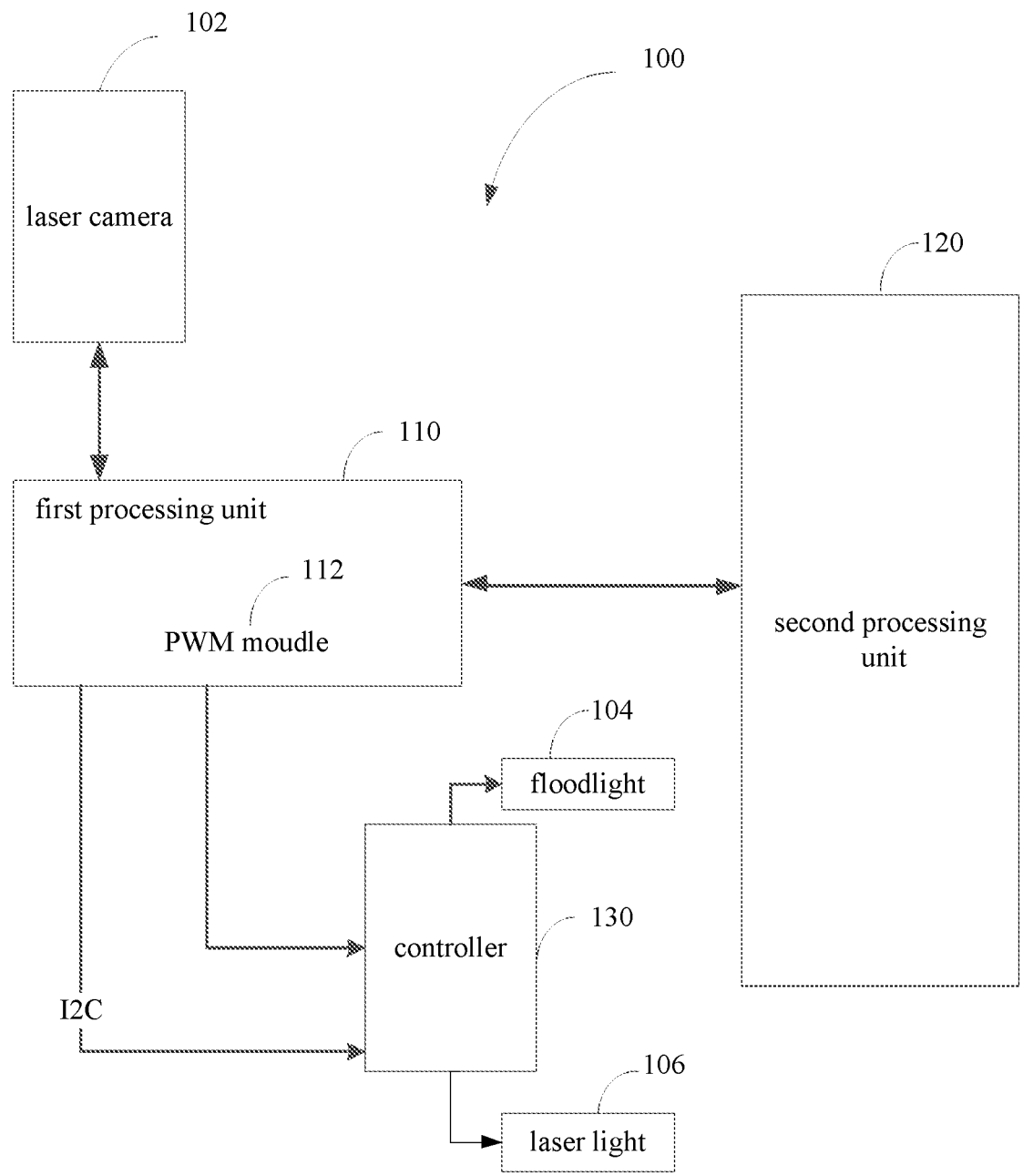
FIG. 3-FIG. 5 are application scenarios illustrating methods for processing data of one or more implementations of the present disclosure.

In order to make objectives, technical solutions and advantages of the present disclosure more clear and obvious, the present disclosure will be further illustrated in detail in combination with accompanying drawings and embodiments hereinafter. It should be understood that, detailed embodiments described herein are intended to explain the present disclosure, which are not limited to the present disclosure.

It should be understood that, although terms "first", "second" and the like may be used by the present disclosure herein to describe various elements, these elements should not be limited by these terms. These terms are only used to distinguish one element from another. For example, without departing from the scope of the present disclosure, a first client may be called as a second client, and similarly, the second client may be called as the first client. Both the first client and the second client are clients, but not the same client.

Please refer to FIG. 1 and FIG. 2, the present disclosure provides a method for processing data. The method includes actions in following blocks.

At block 001, in response to a first processing unit 110 receiving an image collection instruction sent by a second processing unit 120, at least one of a floodlight 104 and a laser light 106 is turned on, and a laser camera 102 is operated to collect a target image.

At block 002, the target image is processed by the first processing unit 110, and the processed target image is sent to the second processing unit 120.

The method for processing data of the present disclosure may be applied to an electronic device 100. The electronic device 100 includes a laser camera 102, a floodlight 104, a laser light 106, a first processing unit 110 and a second processing unit 120. The first processing unit 110 is coupled to the second processing unit 120.

Figure 4:
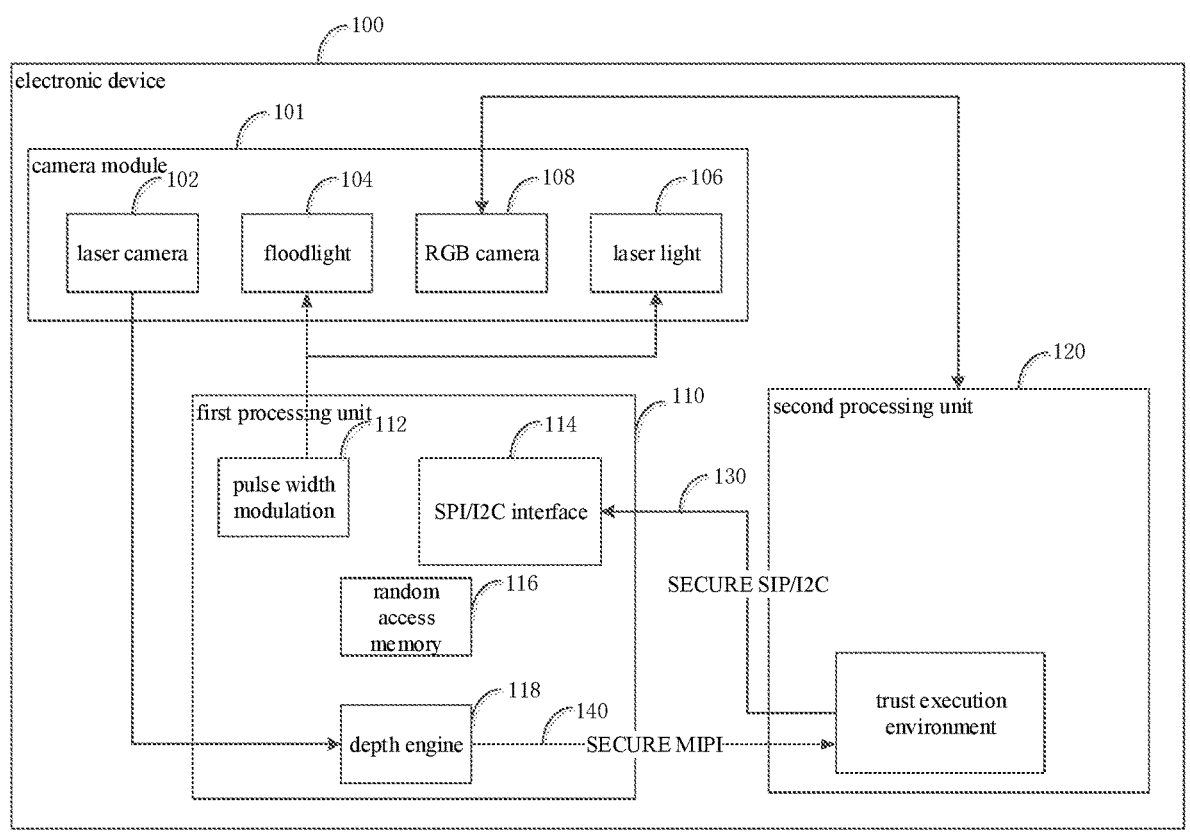

Please refer to FIG. 2-FIG. 4, in an embodiment, in response to the first processing unit 110 receiving the image collection instruction sent by the second processing unit 120, turning on the at least one of the floodlight 104 and the laser light 106 and operating the laser camera 102 to collect the target image at block 001 include actions at block 011 and block 012.

At block 011, in response to the first processing unit 110 receiving the image collection instruction sent by the second processing unit 120, a control instruction is sent to a controller via an inter-integrated circuit (I2C) bus. The control instruction is configured to turn on the at least one of the floodlight 104 and the laser light 106.

When face data is required by an application in the electronic device 100, the application may send a data obtaining request to the second processing unit 120. The face data may include, but be not limited to, data which needs to perform face verification in some scenarios such as face unlocking, face payment and the like, and face depth information. The second processing unit 120 may send the image collection instruction to the first processing unit 110 after receiving the data obtaining request. The first processing unit 110 may be a microprogrammed control unit (MCU) module, and the second processing unit 120 may be a central processing unit (CPU) module.

The electronic device 100 may also include a controller 130. The controller 130 may be respectively coupled to the floodlight 104 and the laser light 106. The floodlight 104 and the laser light 106 may be controlled via a same controller 130. The controller 130 controls the floodlight 104 and the laser light 106, for example, controls the floodlight 104 or the laser light 106 to be turned on, controls switching between the floodlight 104 and the laser light 106, controls the floodlight 104 and the laser light 106 to emit power and the like. The first processing unit 110 may be coupled to the controller 130 by the I2C bus. The I2C bus may implement data transmission among respective devices connected to the bus I2C via a data line and a clock line. The first processing unit 110 may send a control instruction to the controller 130 via the I2C bus in response to receiving the image collection instruction sent by the second processing unit 120. The controller 130 turns on the at least one of the floodlight 104 and the laser light 106 according to the control instruction after receiving the control instruction.

At block 012, a pulse is sent to the controller 130 via a pulse width modulation (PWM) module to illustrate the at least one of the floodlight 104 and the laser light 106 being turned up, and the target image is collected via the laser camera 102.

The first processing unit 110 may be coupled to the controller 130 via the PWM module 112. The first processing unit 110 may send the pulse to the controller 130 via the PWM module 12 to illuminate the at least one of the floodlight 104 and the laser light 106 being turned up when the at least one of the floodlight 104 and the laser light 106 needs to be illuminated. Alternatively, the PWM module 112 may send pulse signals continuously to the controller 130 based on a certain voltage amplitude and a certain time interval, to illuminate the at least one of the floodlight 104 and the laser light 106.

The first processing unit 110 may collect the target image via the laser camera 102. The target image may include an infrared image, a speckle image and the like. When the floodlight 104 is turned up, the PWM module 112 may send the pulse to the controller 130 to illuminate the floodlight 104. The floodlight 104 may be a surface light source irradiating uniformly in all directions. When the floodlight 104 is illuminated, red light may be transmitted, and the laser camera 102 may collect the red light fed back the face to obtain the infrared image. When the laser light 106 is turned on, the PWM module 112 may send the pulse to the controller 130 to illuminate the laser light 106. When the laser light 106 is illuminated, the emitted laser may be diffracted by a lens and diffractive optical elements (DOE) to generate an image with speckle particles. After the image with the speckle particles is projected to the target image, the image with the speckle particles generate offsets of the particles as distances between respective points of the target image and the electronic device 100 are different, and the laser camera 102 collects the image after the offsets of the speckle particles, to obtain the speckle image.

At block 002, the processing is performed on the target image via the first processing unit 110, and the processed target image is sent to the second processing unit 120.

The laser camera 102 may send the collected target image to the first processing unit 110, and the first processing unit 110 may perform the processing on the target image. The target image may include the infrared image, the speckle image and the like. After the first processing unit 110 determines an image type according to the image collection instruction, a target image corresponding to the image type according to the determined image type, and a corresponding processing may be performed on the target image. There may be one or more PWM modules 112. When there are more PWM modules 112, the PWM modules 112 may include a first PWM module and a second PWM module. There may also be one or more controllers 130. When there are more controllers 130, the controllers 130 may include a first controller and a second controller. When the type of the collected image is the infrared image, the first processing unit 110 may send a pulse to the first controller 130 via the first PWM module, to illuminate the floodlight 104, and collect the infrared image via the laser camera 102. The first processing unit 110 performs the processing on the infrared image to obtain an infrared parallax map. When the type of the collected image is the speckle image, the first processing unit 110 may send a pulse to the second controller via the second PWM module, to illuminate the laser light 106, and collect the speckle image via the laser camera 102. The first processing unit 110 performs the processing on the speckle image to obtain a speckle parallax image. When the type of the collected image is a depth image, the first processing unit 110 may collect the speckle image, and perform the processing on the collected speckle image to obtain a depth parallax map.

Further, the first processing unit 110 may perform correction on the target image. Performing the correction refers to corrections for image content offsets of the target image caused by internal parameters and external parameters of the laser camera 102 and the red green blue (RGB) camera 108, for example, for image content offsets caused by a deflection angle of the laser camera 102, and by position layout between the laser camera 102 and the RGB camera 108. The first processing unit 110 may obtain a parallax map of the target image after performing the correction on the target image. For example, the correction may be performed on the infrared image to obtain the infrared parallax map, and the correction may be performed on the speckle image to obtain the speckle parallax map or the depth parallax map. The first processing unit 110 performs the correction on the target image may avoid a condition that an image finally presented on the display of the electronic device 100 appears ghosting.

The first processing unit 110 performs the processing on the target image, and may send the processed target image to the second processing unit 120. The second processing unit 120 may obtain a required image based on the processed target image, such as the infrared image, the speckle image, the depth image and the like. The second processing unit 120 may perform further processing on the required image according to requirement of the application.

For example, when an application needs to perform the face verification, the second processing unit 120 may perform the face detection on the required image obtained etc. The face detection may include face recognition, face matching and living body detection. The face recognition refers to recognize whether there is a face in the target image. The face matching refers to match the face in the target image with a preset face. The living body detection refers to detect whether the face in the target image is biologically active. When the application needs to obtain depth information of the face, the second processing unit 120 may upload the generated target depth image to the application, and the application may perform image optimization process, three-dimensional modeling and the like according to the received target depth image.

In the method for processing data of the embodiment illustrated in FIG. 2, in response to receiving the image collection instruction sent by the second processing unit 120, the first processing unit 110 sends the control instruction to the controller 130 via the I2C to turn on the at least one of the floodlight 104 and the laser light 106, and sends the pulse to the controller 130 via the PWM module 112 to illuminate the at least one of the floodlight 104 and the laser light 106 being turned on. After the target image is collected, the processing is performed on the target image. One controller 130 may realize the control for both the floodlight 104 and the laser light 106, which may reduce complexity for controlling the floodlight 104, the laser light 106 and the like, and save costs.

FIG. 3 is an application scenario of a method for processing data of the embodiment illustrated in FIG. 2. As illustrated in FIG. 3, the electronic device 100 includes a laser camera 102, a floodlight 104, a laser light 106, a first processing unit 110, a second processing unit 120 and a controller 130. The first processing unit 110 may be a MCU module or the like. The second processing unit 120 may be a CPU module or the like. The first processing unit 110 may be coupled to the laser camera 102 and the second processing unit 120. The first processing unit 110 may be coupled to the controller 130 via an I2C bus. The first processing unit 110 may include a PWM module 112, and be coupled to the controller 130 via the PWM module 112. The controller 130 may be respectively coupled to the floodlight 104 and the laser light 106.

The first processing unit 110 sends a control instruction to the controller 130 via the I2C bus in response to receiving an image collection instruction sent by the second processing unit 120. The control instruction may be used to control at least one of the floodlight 104 and the laser light 106 to be turned on. The first processing unit 110 may send a pulse to the controller 130 via the PWM module 112, to illuminate the at least one of the floodlight 104 and the laser light 106 being turned on, and collect a target image via the laser camera 102. The first processing unit 110 may perform processing on the target image, and send the processed target image to the second processing unit 120.

FIG. 4 is an application scenario of a method for processing data of the embodiment illustrated in FIG. 2. As illustrated in FIG. 4, the electronic device 100 may include a camera module 101, a second processing unit 120, and a first processing unit 110. The second processing unit 120 may be a CPU module. The first processing unit 110 may be an MCU module or the like. The first processing unit 110 is coupled between the second processing unit 120 and the camera module 101. The first processing unit 110 may control a laser camera 102, a floodlight 104 and a laser light 106 in the camera module 101. The second processing unit 120 may control an RGB camera 108 in the camera module 101.

The camera module 101 includes the laser camera 102, the floodlight 104, the RGB camera 108 and the laser light 106. The laser camera 102 may be an infrared camera, and may be configured to obtain an infrared image. The floodlight 104 may be a surface light source that can emit infrared light. The laser light 106 may be a point light source with a pattern that can emit laser light. The laser camera 102 may obtain the infrared image according to reflected light when the floodlight 104 emits the infrared light. The laser camera 102 may obtain a speckle image according to reflected light when the laser light 106 emits the laser light. The speckle image is an image with a distorted pattern after a laser forming a pattern and emitted by the laser light 106 is reflected.

The second processing unit 120 may include a CPU kernel operating under a trusted execution environment (TEE) and a CPU kernel operating under a rich execution environment (REE). Both the TEE and the REE are operation modes of an advanced RISC machines (ARM) module. The REE has a higher security level. The second processing unit 120 only has one CPU kernel which may operate under the TEE at the same time. In general, an operation behavior with a high security level in the electronic device 100 needs to be executed in the CPU kernel under the TEE. An operation behavior with a low security level may be executed in the CPU kernel under the REE.

The first processing unit 110 includes a pulse width modulation (PWM) module 112, a serial peripheral interface/inter-integrated circuit (SPI/I2C) interface 114, a random access memory (RAM) module 116 and a depth engine 118. The first processing unit 110 may be coupled to the controller 130 (as illustrated in FIG. 3) controlling the floodlight 104 and the laser light 106 via the PWM module 112. The controller 130 may be respectively coupled to the floodlight 104 and the laser light 106, to control the floodlight 104 and the laser light 106. The first processing unit 110 may also be coupled to the controller 130 via the I2C bus, to control the floodlight 104 or the laser light 106 to be turned on via the I2C bus. The PWM module 112 may emit pulses to the camera module 101, to illuminate the floodlight 104 or the laser light 106 being turned on. The first processing unit 110 may collect an infrared image or a speckle image via the laser camera 102. The SPI/I2C interface 114 may be configured to receive the image collection instruction sent by the second processing unit 120. The depth engine 118 may process the speckle image to obtain a depth parallax map.

In response to the second processing unit 120 receiving the data obtaining request of an application, for example, when the application needs to perform face unlocking or face payment, the image collection instruction may be sent to the first processing unit 110 through the CPU kernel operating under the TEE. After the image collection instruction is received, the first processing unit 110 sends a control instruction to the controller 130 via the I2C bus, to control the floodlight 104 in the camera module 101 to be turned on, emits pulses to the controller 130 via the PWM module 112 to illuminate the floodlight 104, and controls the laser camera 102 to collect an infrared image via the I2C bus. After the image collection instruction is received, the first processing unit 110 may also send a control instruction to the controller 130 via the I2C bus to control the laser light 106 in the camera module 101 to be turned on, emit pulses to the controller 130 via the PWM module 112 to illuminate the laser light 106, and controls the laser camera 102 to collect a speckle image via the I2C. The camera module 101 sends the collected infrared image and the collected speckle image to the first processing unit 110. The first processing unit 110 may perform processing on the received infrared image to obtain an infrared parallax map, and may also perform processing on the received speckle image to obtain a speckle parallax map or a depth parallax map. The first processing unit 110 performs the processing on the infrared image and the speckle image refers to perform correction on the infrared image or the speckle image, to remove effects caused by internal parameters and external parameters in the camera module 101 on the received images. The first processing unit 110 may be set to different modes, and different images are outputted in different modes. When the first processing unit 110 is set to a speckle image mode, the first processing unit 110 processes the speckle image to obtain the speckle parallax map, according to which, a target speckle image may be obtained. When the first processing unit 110 is set to a depth image mode, the first processing unit 110 processes the speckle image to obtain the depth parallax map, according to which, a depth image may be obtained. The depth image refers to an image with depth information. The first processing unit 110 may send the infrared parallax map and the speckle parallax map to the second processing unit 120. The first processing unit 110 may also send the infrared parallax map and the depth parallax map to the second processing unit 120. The second processing unit 120 may obtain the target infrared image according to the infrared parallax map and obtain the depth image according to the depth parallax map. Further, the second processing unit 120 may perform face recognition, face matching and living body detection, and obtain depth information of the detected face according to the target infrared image and the depth image.

The first processing unit 110 communicates with the second processing unit 120 through a fixed security interface, to ensure security for transmitting data. As illustrated in FIG. 4, the second processing unit 120 sends data to the first processing unit 110 through a SECURE SPI/I2C 130, and the first processing unit 110 sends data to the second processing unit 120 through a SECURE mobile industry processor interface (MIPI) 140.

Alternatively, the first processing unit 110 may also obtain the target infrared image according to the infrared parallax map, obtain the depth image according to the depth parallax map, and send the target infrared image and the depth image to the second processing unit 120.

For the method for processing data of the embodiment illustrated in FIG. 2, in combination with FIG. 3 and FIG. 4, alternatively, collecting the target image via the laser camera 102 includes: controlling the laser camera 102 to collect the target image via the I2C bus.

The first processing unit 110 may be coupled to the laser camera via the I2C bus, and control the laser camera 102 to collect the target image via the coupled I2C bus. In an example, the first processing unit 110, the laser camera 102 and the controller 130 may be coupled to a same I2C bus. After the image collection instruction sent by the second processing unit 120 is received, the first processing unit 110 may control the floodlight 104 or the laser light 106 to be turned on via the I2C bus, emit pulses to the controller 130 via the PWM module 112 to illuminate the floodlight 104 or the laser light 106 being turned on, and then control the laser camera 102 to collect the target image such as the infrared image or the speckle image via the coupled I2C bus.

For the method for processing data of the embodiment illustrated in FIG. 2, in combination with FIG. 3 and FIG. 4, alternatively, the first processing unit 110 may perform addressing on the controller 130 via the coupled I2C bus, send a control instruction to the controller 130 to control the floodlight 104 or the laser light 106 to be turned on, and then perform the addressing on the laser camera 102 via the coupled I2C bus to operate the laser camera 102 to collect the target image, such that the same coupled I2C bus is multiplexed at different times, thus saving resources.

Figure 5:
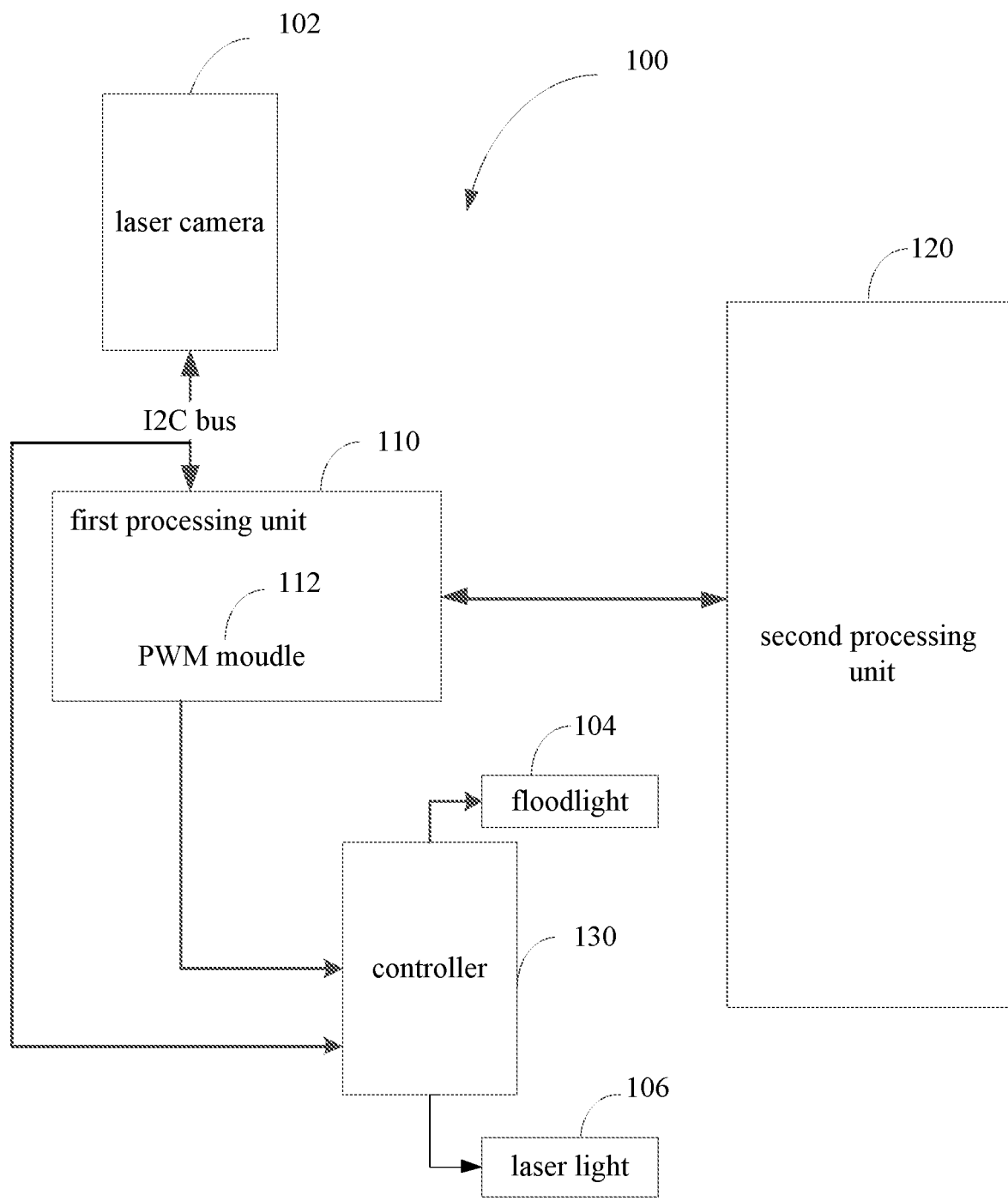

FIG. 5 is a schematic diagram illustrating a first processing unit 110, a laser camera 102 and a controller 130 being coupled to a same I2C bus according to an embodiment. As illustrated in FIG. 5, an electronic device 100 includes the laser camera 102, a floodlight 104, a laser light 106, the first processing unit 110, a second processing unit 120 and the controller 130. The first processing unit 110 may be coupled to the second processing unit 120. The first processing unit 110 may include a PWM module 112, and be coupled to the controller 130 via the PWM module 112. The controller 130 may be coupled to the floodlight 104 and the laser light 106 respectively. The laser camera 102, the first processing unit 110 and the controller 130 may be coupled to the same I2C bus. In response to receiving an image collection instruction sent by the second processing unit 120, the first processing unit 110 sends a control instruction to the controller 130 via the I2C bus, to the floodlight 104 or the laser light 106 to be turned on, sends a pulse to the controller 130 via the PWM module to illuminate the floodlight 104 or the laser light 106 being turned on, and then control the laser camera 102 to collect a target image such as an infrared image or a speckle image via the coupled I2C bus. With the embodiment illustrated in FIG. 5, the floodlight 104, the laser light 106 and the laser camera 102 may be controlled via the I2C bus, and the I2C bus is multiplexed, which may reduce the complexity for controlling a circuit, and save costs.

Figure 6:
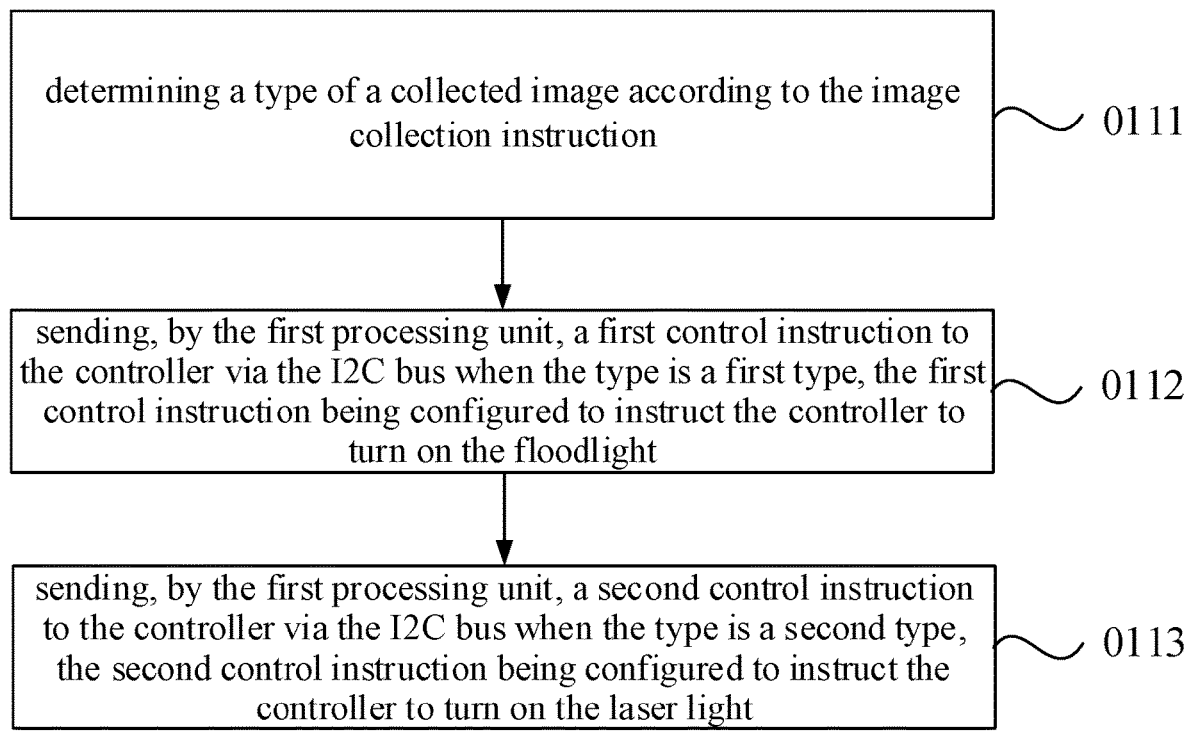
FIG. 6-FIG. 13 are flow charts illustrating methods for processing data of one or more implementations of the present disclosure.

For the method for processing data of the embodiment illustrated in FIG. 2, referring to FIG. 3, FIG. 4 and FIG. 6, alternatively, sending the controlling instruction to the controller 130 via the I2C bus includes following acts.

At block 0111, a type of a collected image is determined based on the image collection instruction.

At block 0112, when the type of the collected image is a first type, the first processing unit 110 sends a first control instruction to the controller 130 via the I2C bus. The first control instruction is configured to instruct the controller 130 to turn on the floodlight 104.

The first processing unit 110 receives the image collection instruction sent by the second processing unit 120, and the type of the collected image may be determined according to the image collection instruction. The image type may be one or more kinds of an infrared image, a speckle image, a depth image, and the like. The image type may be determined according to face data required by an application. After the second processing unit 120 receives a data obtaining request, the image type may be determined according to the data obtaining request, and an image collection instruction included in the image type is sent to the first processing unit 110. For example, when the application requires to data performing face unlocking, the second processing unit 120 may determine that the image type is the infrared image or the speckle image, and when the application requires to face depth information, it is further determined that the image type is the depth image, which is not limited thereto.

When the image type is the first type, in this embodiment, the first type may be the infrared image, and the first processing unit 110 may send the first control instruction to the controller 130 via the coupled I2C bus, and the controller 130 may turn on the floodlight 104 according to the first control instruction. The first processing unit 110 may emit a pulse to the controller 130 via the PWM module 112, to illuminate the floodlight 104. Alternatively, the first processing unit 110 may perform addressing on the controller 130 via the I2C bus, and send the first control instruction to the controller 130.

At block 0113, when the type of the collected image is a second type, the first processing unit 110 sends a second control instruction to the controller 130 via the I2C bus. The second control instruction is configured to instruct the controller 130 to turn on the laser light 106.

When the image type is the second type, in this embodiment, the second type may be the speckle image, the depth image or the like, the first processing unit 110 may send the second control instruction to the controller 130 via the coupled I2C bus. The controller 130 may turn on the laser light 106 according to the second control instruction. The first processing unit 110 may send a pulse to the controller 130 via the PWM module 112, to illuminate the laser light 106.

The first processing unit 110 determines the type of the collected image according to the image collection instruction. The type of the collected image may include at least two kinds of types. For example, the types of the collected image include the first type and the second type. When the type of the collected image includes the infrared image and the speckle image simultaneously, or includes the speckle image and the depth image simultaneously, the camera module 101 needs to collect the infrared image and the speckle image simultaneously. The first processing unit 110 may control the camera module 101 to collect the infrared image firstly, or to collect the speckle image firstly, which does not limit a collection sequence. The first processing unit 110 may send the first control instruction to the controller 130 via the I2C bus, to turn on the floodlight 104, and send the pulse to the controller 130 via the PWM module 112, to illuminate the floodlight 104, and then control the laser camera 102 to collect the infrared image via the I2C bus. After the laser camera 102 is controlled to collect a target image corresponding to the first type, the first processing unit 110 sends the second control instruction to the controller 139 via the I2C bus to turn on the laser light 106, emits a pulse to the controller 130 via the PWM module to illuminate the laser light 106, and controls the laser camera 102 to collect the speckle image via the I2C bus. Alternatively, when the type of the collected image includes the first type and the second type simultaneously, the first processing unit 110 may also send the second instruction to the controller 130 via the I2C to turn on the laser light 106, emits a pulse to the controller 130 via the PWM module 112 to illuminate the laser light 106, and control the laser light 102 to collect the speckle image via the I2C bus. After the laser camera 102 is controlled to collect a target image corresponding to the second type, the first processing unit 110 sends the first control instruction to turn on the floodlight 104 via the I2C bus, emits a pulse to the controller 130 via the PWM module 112 to illuminate the floodlight 104, and controls the laser camera 102 to collect the infrared image via the I2C bus.

Alternatively, the first processing unit 110 may send the first control instruction and the second control instruction to the controller 130 at different time points. A time interval between a time point at which the first processing unit 110 sends the first control instruction and a time point at which the first processing unit 110 sends the second processing instruction is smaller than a time threshold. The laser camera 102 may collect the speckle image at the time interval smaller than the time threshold after collecting the infrared image, such that image content of the collected infrared image is consistent with image content of the collected speckle image, and subsequent processing such as face detection is performed conveniently. The time threshold may be set based on an actual requirement, such as 20 milliseconds, 30 milliseconds or the like. It is ensured that the image content of the collected infrared image is consistent the image content of the collected speckle image, and accuracy for subsequent face detection may be improved. In this embodiment, switching and controlling between the floodlight 104 and the laser light 106 may be achieved via the controller 130, the complexity for controlling the circuit may be reduced, the costs may be reduced.

Figure 7:
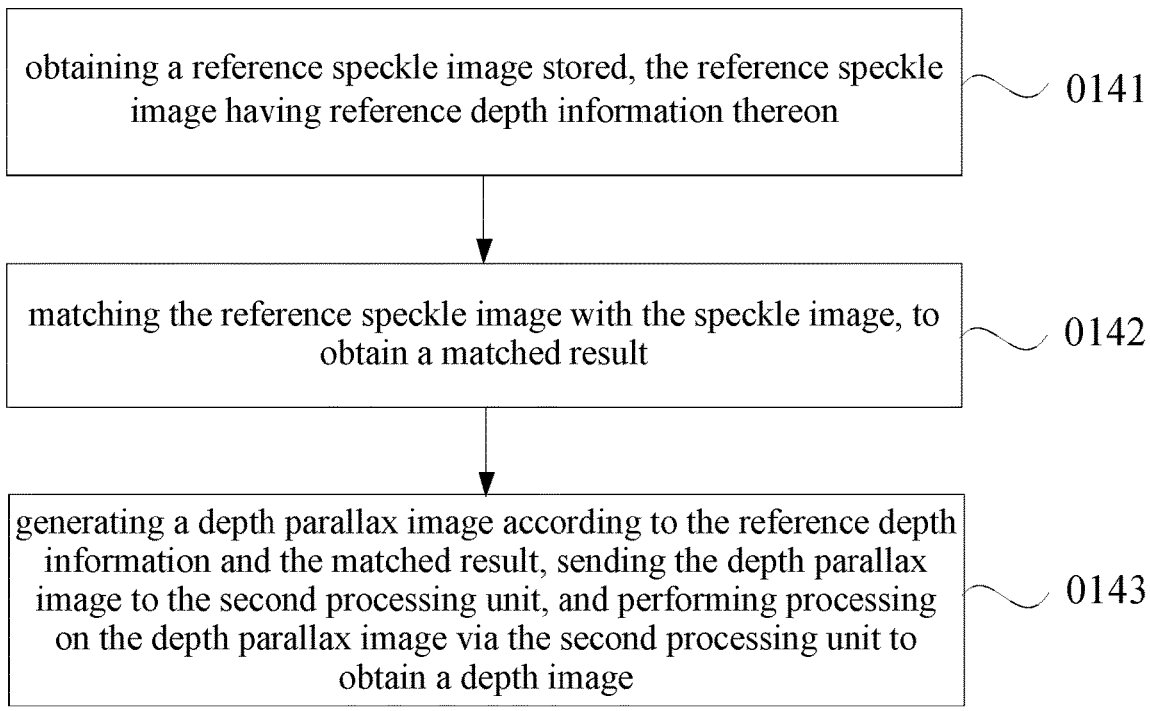

For the method for processing data of the embodiment illustrated in FIG. 2, referring to FIG. 3, FIG. 4 and FIG. 7, alternatively, performing the processing on the target image via the first processing unit 110 and sending the processed target image to the second processing unit 120 at block 002 include following acts.

At block 0141, a reference speckle image stored is obtained, and the reference speckle image has reference depth information thereon.

In a camera coordinate system, line perpendicular to an imaging plane and passing through a center of a mirror is taken as Z axis. When a coordinate of an object in the camera coordinate system is (X, Y, Z), Z value is the depth information of the object in the imaging plane of the camera. When an application needs to obtain depth information of a face, a depth image including the depth information of the face needs to be collected. The first processing unit 110 may control a laser light 106 to be turned on via the I2C bus, and control the laser camera 102 to collect a speckle image via the I2C bus. The first processing unit 110 may store the reference speckle image in advance. The reference speckle image may have the reference depth information. Depth information of respective pixels included in the speckle image may be obtained according to the collected speckle image and the reference speckle image.

At block 0142, the reference speckle image is matched with the speckle image, to obtain a matched result.

The first processing unit 110 may take respective pixels included in the collected speckle image as the center successively, and select one pixel block with a preset size, such as a pixel size of 31 pixels*31 pixels, and search for a block in the reference speckle image which matches the selected pixel block. The first processing unit 110 may find two points on a same laser light path respectively in the speckle image and the reference speckle image from the selected pixel block in the collected speckle image and the matched block in the reference speckle image. Speckle information of the two points on the same laser light path is consistent. The two points on the same laser light path may be identified as corresponding pixels. In the reference speckle image, depth information of the points on each laser light path is known. The first processing unit 110 may calculate an offset between the two corresponding pixels on the same laser light path in the target speckle image and the reference speckle image, and obtain the depth information of respective pixels included in the collected speckle image according to the offset.

In an embodiment, the first processing unit 110 calculates the offset between the collected speckle image and the reference speckle image, and obtains the depth information of respective pixels included in the speckle image according to the offset by the following formula (1).

$$Z_D = \frac{L \times f \times Z_0}{L \times f + Z_0 \times P}, \quad (1)$$

where $Z_D$ represents depth information of a pixel, i.e., a depth value of the pixel. L represents a distance between the laser camera 102 and the laser (i.e., the laser light 106). f represents a focal length of a lens in the laser camera 102. $Z_0$ represents a depth value between a reference plane and the laser camera 102 of the electronic device 100 when the reference speckle image is collected. P represents the offset between the corresponding pixels in the collected speckle image and the reference speckle image. P may be obtained by multiplying the number of offset pixels between the target speckle image and the reference speckle image by an actual distance of one pixel. When a distance between the target object and the laser camera 102 is greater than a distance between the reference plane and the laser camera 102, P is a negative value. When the distance between the target object and the laser camera 102 is smaller than the distance between the reference plane and the laser camera 102, P is a positive value.

At block 0143, a depth parallax map is generated according to the reference depth information and the matched result, the depth parallax map is sent to the second processing unit 120, and processing is performed on the depth parallax map via the second processing unit 120 to obtain a depth image.

The first processing unit 110 may perform correction on the collected speckle image after obtaining the depth information of respective pixels included in the collected speckle image, to correct image content offset of the collected speckle image caused by internal parameters and external parameters of the laser camera 102 and the RGB camera 108. The first processing unit 110 may generate the depth parallax map according to the corrected speckle image and the depth values of respective pixels in the speckle image, and send the depth parallax map to the second processing unit 120. The second processing unit 120 may obtain the depth image according to the depth parallax map. The depth image may include the depth information of respective pixels. The second processing unit 120 may upload the depth image to the application. The application may perform image optimization, three-dimensional modeling and the like according to depth information of the face in the depth image. The second processing unit 120 may also perform living body detection according to the depth information of the face in the depth image, which may avoid that the collected face is a face in a plane picture.

For the method for processing data of the embodiment illustrated in FIG. 2, in combination with FIG. 3 and FIG. 4, alternatively, the second processing unit 120 in the electronic device 100 may include two operation modes. The first operation mode may be a TEE. The TEE is a trusted execution environment, of which a security level is high. The second operation mode may be performed in the REE. The REE is a rich execution environment, of which a security level is low. The second processing unit 120 may send an image collection instruction to the first collection unit 110 through the first operation mode in response to receiving the data obtaining request sent by the application. When the second processing unit 120 has a kernel CPU, the single kernel may be directly switched from the second operation mode to the first operation mode. When the second processing unit 120 has multiple kernels, one kernel may be switched from the second operation mode to the first operation mode, other kernels still operate in the second operation mode, and the image collection instruction is sent to the first processing unit 110 through the kernel operating in the first operation mode.

After processing the collected target image, the first processing unit 110 sends the processed target image to the kernel operating in the first operation mode, which may ensure that the first processing unit 110 is always operating in the trusted execution environment, improving the security. The second processing unit 120 may be in the kernel operating in the first operation mode, obtain a required image according to the processed target image, and perform processing on the required image according to the requirement of the application. For example, the second processing unit 120 may perform face detection on the required image in the kernel operating in the first operation mode. The image collection instruction is sent to the first processing unit 110 through a kernel with a high security level where the second processing unit 120 operates, it may be ensured that the first processing unit 110 is in an environment with a high security level, which may improve data security.

In an embodiment, since there is only one kernel operating in the first operation mode, in response to the second processing unit 120 performing the face detection on the target image in the TEE, a serial mode may be employed to perform face recognition, face matching, living body detection and the like sequentially on the target image. The second processing unit 120 may perform the face recognition on the required image firstly. When a face is recognized, the second processing unit 120 matches the face included in the required image with a pre-stored face, to determine whether the two faces are identical. When the two faces are identical, the second processing unit 120 performs the living body detection on the face according to the required image, to prevent that the collected face is a plane face. When the face is not recognized, the face matching and the living body detection are not performed, which may reduce the process burden of the second processing unit 120.

In this embodiment, the depth information of the collected image may be obtained accurately through the first processing unit 110, the efficiency for processing data is improved and the accuracy for processing the image is improved.

Figure 8:
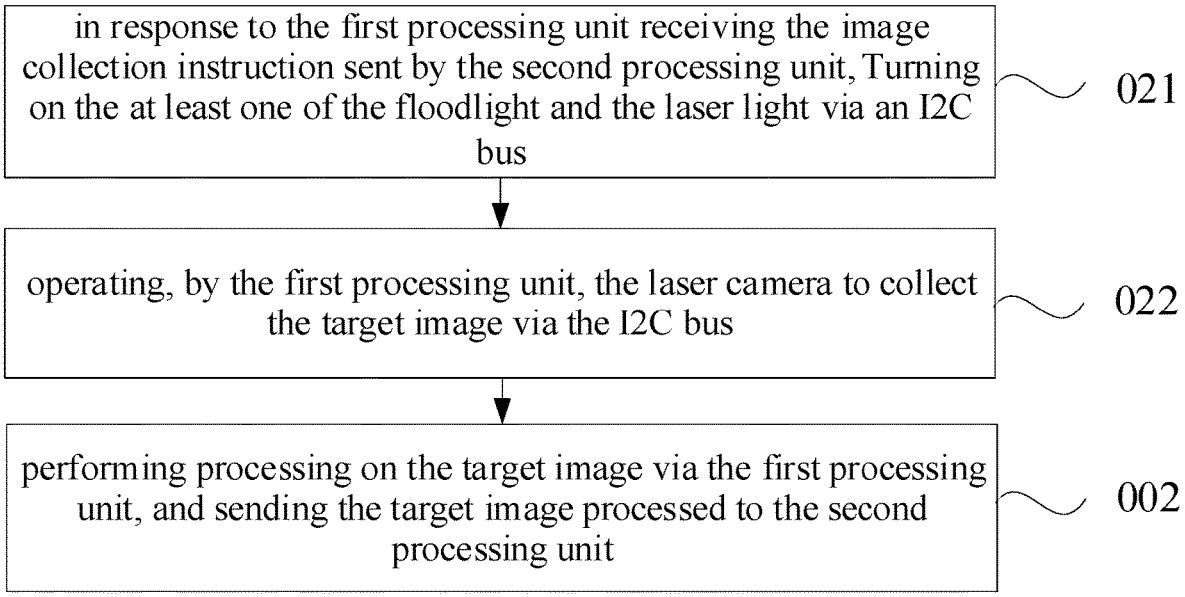

Please refer to FIG. 4, FIG. 5 and FIG. 8, in another embodiment, in response to the first processing unit 110 receiving the image collection instruction sent by the second processing unit 120, turning on the at least one of the floodlight 104 and the laser light 106 via an I2C bus and operating the laser camera 102 to collect the target image at block 011 include acts at block 021 and block 022.

At block 021, in response to the first processing unit 110 receiving the image collection instruction sent by the second processing unit 120, the at least one of the floodlight 104 and the laser light 106 is turned on via the I2C bus.

When face data is required by an application in the electronic device 100, the application may send a data obtaining request to the second processing unit 120. The face data may include, but be not limited to, data for face verification in a scenario such as face unlocking, face payment and the like, and face depth information. The second processing unit 120 may send the image collection instruction to the first processing unit 110 after receiving the data obtaining request. The first processing unit 110 may be an MCU module, and the second processing unit may be a CPU module.

The first processing unit 110, and a laser camera 102, a floodlight 104 and a laser light 106 in a camera module 101 may be coupled to a same I2C bus. The I2C may implement data communication among respective elements coupled to the I2C bus through a data line and a clock line. After the image collection instruction sent by the second processing unit 120 is received, the first processing unit 110 may simultaneously send control instructions to the floodlight 104 and/or the laser light 106 coupled to the I2C bus via the I2C bus, to control the at least one of the floodlight 104 and the laser light 106 to be turned on.

In an embodiment, the first processing unit 110 may determine a light needing to be controlled currently is the floodlight 104 or the laser light 106 according to the image collection instruction after receiving the image collection instruction. When there is a need to control the floodlight 104 to be turned on, the first processing unit 110 may perform addressing on the floodlight 104 coupled to the I2C bus via the I2C bus, and send a control instruction to the floodlight 104, to control the floodlight 104 to be turned on. When there is a need to control the laser light 106 to be turned on, the first processing unit 110 may perform addressing on the laser light 106 coupled to the I2C bus via the I2C bus, and send a control instruction to the laser light 106 to control the laser light 106 to be turned on.

At block 022, the first processing unit 110 controls the laser camera 102 to collect the target image via the I2C bus.

The first processing unit 110 controls the at least one of the floodlight 104 and the laser light 106 to be turned on via the I2C bus, and controls the laser camera 102 to collect the target image via the I2C bus. The target image may include an infrared image, a speckle image and the like. The first processing unit 110 may control the floodlight 104 in the camera module 101 to be turned on via the I2C, and control the laser camera 102 to collect the infrared image via the I2C bus. The floodlight 104 may be a surface light source irradiating uniformly in all directions. Light rays emitted by the floodlight 104 may be infrared light. The laser camera 102 may collect the red light fed back the face to obtain the infrared image. The laser light 106 in the camera module 102 is controlled to be turned on via the I2C bus, and the laser camera 102 is controlled to collect the speckle image and the like via the I2C bus. When the laser light 106 is illuminated, the emitted laser may be diffracted by a lens and diffractive optical elements (DOE) to generate an image with speckle particles. After the image with the speckle particles is projected to the target image, the image with the speckle particles generate offsets of the particles because distances between respective points of the target image and the electronic device are different, and the laser camera 102 collects the image after the speckle particles offset, to obtain the speckle image.

In an example, the first processing unit 110 performs addressing on the floodlight 104 or the laser light 106 coupled to the I2C bus via the I2C bus, and sends the control instruction to the floodlight 104 or the laser light 106. After the floodlight 104 or the laser light 106 is controlled to be turned on, the first processing unit 110 may perform addressing on the laser camera 102 coupled to the I2C bus via the I2C bus, and send the control instruction to the laser camera 102 to operate the laser camera 102 to collect the infrared image or the speckle image.

At block 002, the processing is performed on the target image via the first processing unit 110, and the target image processed is sent to the second processing unit 120.

The laser camera 102 may send the collected target image to the first processing unit 110. The first processing unit 110 may perform processing on the target image. The first processing unit 110 may be set in different modes. The first processing unit 110 may collect different first images in different modes, and perform different processes on the target image. When the first processing unit 110 is in an infrared mode, the first processing unit 110 may control the floodlight to be turned on, operate the laser camera 102 to collect an infrared image via the I2C bus, and process the infrared image to obtain an infrared parallax map. When the first processing unit 110 is in a speckle image mode, the first processing unit 110 may control the laser light 106 to be turned on via the I2C bus, operate the laser camera 102 to collect a speckle image via the I2C bus, and process the speckle image to obtain a speckle parallax map. When the first processing unit 110 is in a depth image mode, the first processing unit 110 may control the laser light 106 to be turned on via the I2C bus, operate the laser camera 102 to collect the speckle image via the I2C bus, and process the speckle image to obtain a depth parallax map.

Further, the first processing unit 110 may perform correction on the target image. Performing the correction refers to correct image content offset of the target image caused by internal parameters and external parameters of the laser camera 102 and the RGB camera 108, such as image content offset caused by a deflection angle of the laser camera 102, and position layout between the laser camera 102 and the RGB camera 108. A parallax map of the target image may be obtained after performing the correction on the target image. For example, the first processing unit 110 performs the correction on the infrared image to obtain the infrared parallax map, and perform the correction on the speckle image to obtain the speckle parallax map or the depth parallax map. Performing the correction on the target image by the first processing unit 110 may avoid a condition that an image finally presented on the display of the electronic device 100 appears ghosting.

The first processing unit 110 may process the target image, and then send the processed target image to the second processing unit 120. The second processing unit 120 may obtain a required image according to the processed target image, such as an infrared image, a speckle image, a depth image, and the like. The second processing unit 120 may process the required image according to requirement of the application.

For example, when the application needs to perform face verification, the second processing unit 120 may perform face detection according to the required image and the like. The face detection may include face recognition, face matching and living body detection. The face recognition refers to recognize whether there is a face in the target image. The face matching refers to match the face in the target image with a preset face. The living body detection refers to detect whether the face in the target image is biologically active. When the application needs to obtain depth information of the face, the second processing unit 120 may upload the generated target depth image to the application. The application may perform image optimization process, three-dimensional modeling and the like according to the received depth image.

In the method for processing data of the embodiment illustrated in FIG. 8, a laser camera 102, a floodlight 104, a laser light 106 and the first processing unit 110 may be coupled to a same I2C bus. The first processing unit 110 controls at least one of the floodlight 104 and the laser light 106 to be turned on via the I2C bus, operates the laser camera 102 to collect a target image via the I2C bus, and controls the floodlight 104, the laser light 106 and the laser camera 102 via the same I2C bus, to perform multiplexing on the I2C bus, which may reduce the complexity for controlling the circuit and reduce the costs.

FIG. 5 is an application scenario of a method for processing data of the embodiment illustrated in FIG. 8. As illustrated in FIG. 5, the electronic device 100 includes a laser camera 102, a laser light 106, a floodlight 104, a first processing unit 110, a second processing unit 120 and a controller 130. The first processing unit 110 may be a MCU module or the like. The second processing unit 120 may be a CPU module or the like. The first processing unit 110 may be coupled to the laser camera 102, the laser light 106, the floodlight 104 and the second processing unit 120. The controller 130 may be respectively coupled to the floodlight 104 and the laser light 106. The controller 130 may control the laser light 106 and the floodlight 104. The laser camera 102, the controller 130 and the first processing unit 110 are coupled to an I2C bus.

The first processing unit 110 may control at least one of the floodlight 104 and the laser light 106 to be turned on via the I2C bus in response to receiving an image collection instruction sent by the second processing unit 120. The first processing unit 110 may send the control instruction to the controller 130 coupled the I2C bus. The controller 130 may control the at least one of the floodlight 104 and the laser light 106 to be turned on according to a control instruction after receiving the control instruction. The first processing unit 110 may illuminate the floodlight 104 and the laser light 106 via a PWM module 112. The first processing unit 110 may operate the laser camera 102 to collect the target image via the I2C bus. The first processing unit 110 performs processing on the collected target image, and sends the processed target image to the second processing unit 120.

FIG. 4 is another application scenario of the method for processing data of the embodiment illustrated in FIG. 8. As illustrated in FIG. 4, the electronic device 100 may include a camera module 101, a second processing unit 120, and a first processing unit 110. The second processing unit 120 may be CPU module. The first processing unit 110 may be a MCU module or the like. The first processing unit 110 may be coupled between the second processing unit 120 and the camera module 101. The first processing unit 110 may control a laser camera 102, a floodlight 104 and a laser light 106 in the camera module 101. The second processing unit 120 may control a RGB camera 108 in the camera module 101.

The camera module 101 includes the laser camera 102, the floodlight 104, the RGB camera 108 and the laser light 106. The laser camera 102 may be an infrared camera, and may be configured to obtain an infrared image. The floodlight 104 may be a surface light source that can emit infrared light. The laser light 106 may be a point light source with a pattern that can emit laser light. The laser camera 102 may obtain the infrared image according to reflected light when the floodlight 104 emits the infrared light. The laser camera 102 may obtain a speckle image according to reflected light when the laser light 106 emits the laser light. The speckle image is an image with a distorted pattern after a laser having a pattern and emitted by the laser light 106 is reflected. The laser camera 102, the floodlight 104, the laser light 106 and the first processing unit 110 may be coupled to a same I2C bus.

The second processing unit 120 may include a CPU kernel operating under a trusted execution environment (TEE) and a CPU kernel operating under a rich execution environment (REE). Both the TEE and the REE are operation modes of an advanced RISC machines (ARM) module. The REE has a higher security level. The second processing unit 120 only has one CPU kernel which may operate under the TEE at the same time. In general, an operation behavior with a high security level in the electronic device 100 needs to be executed in the CPU kernel under the TEE. An operation behavior with a low security level may be executed in the CPU kernel under the REE.

The first processing unit 110 includes a pulse width modulation (PWM) module 112, a serial peripheral interface/inter-integrated circuit (SPI/I2C) interface 114, a random access memory (RAM) module 116 and a depth engine 118. The first processing unit 110 may control the floodlight 104 or the laser light 106 via the coupled I2C bus. The above PWM module 112 may emit a pulse to the camera module 101, to illuminate the floodlight 104 or the laser light 106 being turned on. The first processing unit 110 may operate the laser camera 102 to collect an infrared image or a speckle image via the I2C bus. The SPI/I2C interface 114 may be configured to receive the image collection instruction sent by the second processing unit 120. The depth engine 118 may process the speckle image to obtain a depth parallax map.

In response to the second processing unit 120 receiving a data obtaining request of an application, for example, when the application needs to perform face unlocking or face payment, the image collection instruction may be sent to the first processing unit 110 through the CPU kernel operating under the TEE. After the image collection instruction is received, the first processing unit 110 may control the floodlight 104 in the camera module 101 to be turned on via the I2C bus, emits a pulse via the PWM module 112 to illuminate the floodlight 104, and operates the laser camera 102 to collect an infrared image via the I2C bus, and the first processing unit 110 may also control the laser light 106 in the camera module 101 to be turned on via the I2C bus and operates the laser camera 102 to collect a speckle image via the I2C. The camera module 101 sends the collected infrared image and the collected speckle image to the first processing unit 110. The first processing unit 110 may perform processing on the received infrared image to obtain an infrared parallax map, and may also perform processing on the received speckle image to obtain a speckle parallax map or a depth parallax map. The first processing unit 110 performs the processing on the infrared image and the speckle image refers to perform correction on the infrared image or the speckle image, to remove effects caused by internal parameters and external parameters in the camera module 101 on the received images. The first processing unit 110 may be set to different modes, and different images are outputted in different modes. When the first processing unit 110 is set to a speckle image mode, the first processing unit 110 processes the speckle image to obtain the speckle parallax map, according to which, a target speckle image may be obtained. When the first processing unit 110 is set to a depth image mode, the first processing unit 110 processes the speckle image to obtain the depth parallax map, according to which, a depth image may be obtained. The depth image refers to an image with depth information. The first processing unit 110 may send the infrared parallax map and the speckle parallax map to the second processing unit 120. The first processing unit 110 may also send the infrared parallax map and the depth parallax map to the second processing unit 120. The second processing unit 120 may obtain the target infrared image according to the infrared parallax map and obtain the depth image according to the depth parallax map. Further, the second processing unit 120 may perform face recognition, face matching and living body detection, and obtain depth information of the detected face according to the target infrared image and the depth image.

The first processing unit 110 communicates with the second processing unit 120 through a fixed security interface, to ensure security for transmitting data. As illustrated in FIG. 4, the second processing unit 120 sends data to the first processing unit 110 through a SECURE SPI/I2C 130, and the first processing unit 110 sends data to the second processing unit 120 through a SECURE mobile industry processor interface (MIPI) 140.

Alternatively, the first processing unit 110 may also obtain the target infrared image according to the infrared parallax map, obtain the depth image according to the depth parallax map, and send the target infrared image and the depth image to the second processing unit 120.

Figure 9:
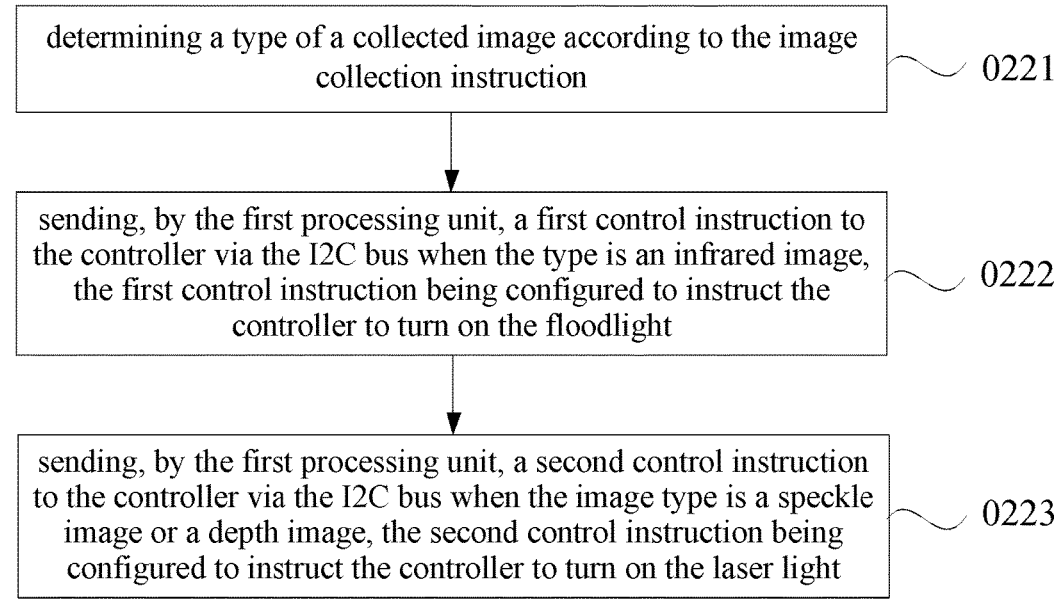

For the method for processing data of the embodiment illustrated in FIG. 8, please refer to FIG. 4, FIG. 5, and FIG. 9 together. Alternatively, controlling the at least one of the floodlight and the laser light to be turned on via the I2C bus includes following acts.

At block 0221, a collected image type is determined according to the image collection instruction.

The first processing unit 110 receives an image collection instruction sent by the second processing unit 120, and the type of the collected image may be determined according to the image collection instruction. The type of the collected image may be one or more kinds of an infrared image, a speckle image, a depth image, and the like. The type may be determined according to face data required by an application. After the second processing unit 120 receives a data obtaining request, the type may be determined according to the data obtaining request, and an image collection instruction included in the type is sent to the first processing unit 110. For example, when the application requires to data performing face unlocking, the type of the collected image may be determined to be the infrared image or the speckle image, and when the application requires to face depth information, the type of the collected image may be determined to be the depth image, which is not limited thereto.

At block 0222, the first processing unit 110 sends a first control instruction to the controller 130 via the I2C bus when the image type is an infrared image, and the first control instruction is configured to instruct the controller 130 to turn on the floodlight 104.

The electronic device 100 may also be provided with a controller 130. The floodlight 104 and the laser light 106 may share a same controller 130. The controller 130 may be coupled to the floodlight 104 and the laser light 106 respectively. The controller 130 is configured to control the floodlight 104 and the laser light 106, which may include to control the floodlight 104 or the laser light 106 to be turned on, to control switching between the floodlight 104 and the laser light 106, and to control the floodlight 104 and the laser light 106 to emit power. The controller 130, the laser camera 102 and the first processing unit 110 may be coupled to a same I2C bus.

When the image type indicates that the collected image is an infrared image, the first processing unit 110 may send a first control instruction to the controller 130 via the coupled I2C bus, and the controller 130 may control the floodlight 104 to be turned on according to the first control instruction. The first processing unit 110 may emit a pulse to the controller 130 through the PWM module 112, to illuminate the floodlight. Alternatively, the first processing unit 110 may perform addressing on the controller 130 via the I2C, and send the first control instruction to the controller 130.

At block 0223, the first processing unit 110 sends a second control instruction to the controller 130 via the I2C bus when the type is a speckle image or a depth image, and the second control instruction is configured to instruct the controller 130 to turn on the laser light.

When the collected image is a speckle image or a depth image, the first processing unit 110 sends the second control instruction to the controller 130 via the coupled I2C bus, and the controller 130 may control the laser light 106 to be turned on according to the second control instruction. The first processing unit 110 may send a pulse to the controller 130 via a PWM module 12, to illuminate the laser light 106.

Alternatively, the types may be multiple, which may include the infrared image and the speckle image simultaneously, include the infrared image and the depth image simultaneously, or include the infrared image, the speckle image and the depth image simultaneously. The first processing unit 110 may respectively control the floodlight 104 to be turned on to collect the infrared image, and turn on the laser light 106 to collect the speckle image. The first processing unit 110 may operate the laser camera 102 to collect the infrared image firstly, or may also operate the laser light 102 to collect the speckle image firstly. The collection sequence is not limited herein.

Alternatively, when the image type includes the infrared image and the speckle image, or includes the infrared image and the depth image, the first processing unit 110 may send the first control instruction to the controller 130 via the I2C bus to turn on the floodlight 104, operate the laser camera 102 to collect the infrared image via the I2C bus, send the second control instruction to the controller 130 via the I2C bus to turn on the laser light 106, and operate the laser camera 102 to collect the speckle image via the I2C bus.

Alternatively, when the image type includes the infrared image and the speckle image, or includes the infrared image and the depth image, the first processing unit 110 may send the second control instruction to the controller 130 via the I2C bus to turn on the laser light 106, operate the laser camera 102 to collect the infrared image via the I2C bus, send the first control instruction to the controller 130 via the I2C bus to turn on the floodlight 104, and operate the laser camera 102 to collect the speckle image via the I2C bus.

In this way, time division multiplexing may be performed on the same I2C bus, which may reduce the complexity for controlling the circuit, and reduce the costs.

In a method for processing data of the embodiment illustrated in FIG. 9, the first processing unit 110 may implement switching and control between the floodlight 104 and the laser light 106 via a controller 130, which may further reduce the complexity for controlling the circuit, and reduce the costs.

Figure 10:
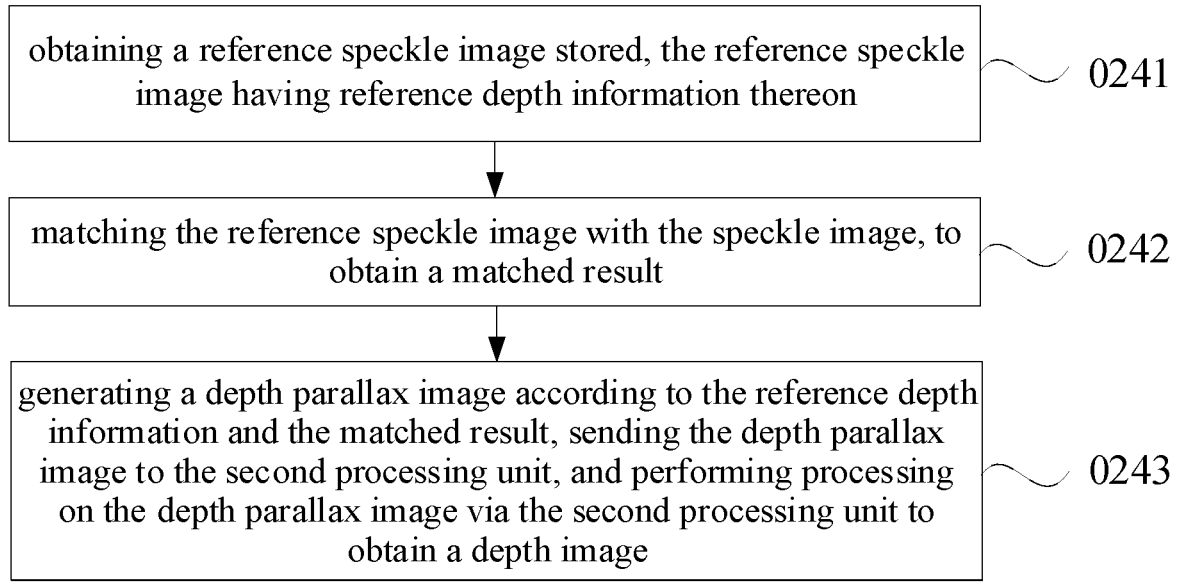

For the method for processing data of the embodiment illustrated in FIG. 8, please refer to FIG. 4, FIG. 5, and FIG. 10 together. Alternatively, performing processing on the target image via the first processing unit 110 and sending the processed target image to the second processing unit 120 at block 002 may include actions in following blocks.

At block 0241, a reference speckle image stored is obtained, and the reference speckle image has reference depth information thereon.

In a camera coordinate system, a line perpendicular to an imaging plane and passing through a center of a mirror is taken as Z axis. When a coordinate of an object in the camera coordinate system is (X, Y, Z), Z value is the depth information of the object in the imaging plane of the camera. When an application needs to obtain depth information of a face, a depth image including the depth information of the face needs to be collected. The first processing unit 110 may control to turn on a laser light 106 via the I2C bus, and operate the laser camera 102 to collect a speckle image via the I2C bus. The first processing unit 110 may store the reference speckle image in advance. The reference speckle image may have the reference depth information. Depth information of respective pixels included in the speckle image may be obtained according to the collected speckle image and the reference speckle image.

At block 0242, the reference speckle image is matched with the speckle image, to obtain a matched result.

The first processing unit 110 may take respective pixels included in the collected speckle image as the center successively, and select one pixel block with a preset size, such as a pixel size of 31 pixels*31 pixels, and search for a block in the reference speckle image which matches the selected pixel block. The first processing unit 110 may find two points on a same laser light path respectively in the speckle image and the reference speckle image from the selected pixel block in the collected speckle image and the matched block in the reference speckle image. Speckle information of the two points on the same laser light path is consistent. The two points on the same laser light path may be identified as corresponding pixels. In the reference speckle image, depth information of the points on each laser light path is known. The first processing unit 110 may calculate an offset between the two corresponding pixels on the same laser light path in the target speckle image and the reference speckle image, and obtain the depth information of respective pixels included in the collected speckle image according to the offset.

In an embodiment, the first processing unit 110 calculates the offset between the collected speckle image and the reference speckle image, and obtains the depth information of respective pixels included in the speckle image according to the offset by the following formula (2).

$$Z_D = \frac{L \times f \times Z_0}{L \times f + Z_0 \times P}, \quad (2)$$

where $Z_D$ represents depth information of a pixel, i.e., a depth value of the pixel. L represents a distance between the laser camera 102 and the laser (i.e., the laser light 106). f represents a focal length of a lens in the laser camera 102. $Z_0$ represents a depth value between a reference plane and the laser camera 102 of the electronic device 100 when the reference speckle image is collected. P represents the offset between the corresponding pixels in the collected speckle image and the reference speckle image. P may be obtained by multiplying the number of offset pixels between the target speckle image and the reference speckle image by an actual distance of one pixel. When a distance between the target object and the laser camera 102 is greater than a distance between the reference plane and the laser camera 102, P is a negative value. When the distance between the target object and the laser camera 102 is less than the distance between the reference plane and the laser camera 102, P is a positive value.

At block 0243, a depth parallax map is generated according to the reference depth information and the matched result, the depth parallax map is sent to the second processing unit 120, and the depth parallax map is processed by the second processing unit 120 to obtain a depth image.

The first processing unit 110 may perform correction on the collected speckle image after obtaining the depth information of respective pixels included in the collected speckle image, to correct image content offset of the collected speckle image caused by internal parameters and external parameters of the laser camera 102 and the RGB camera 108. The first processing unit 110 may generate the depth parallax map according to the corrected speckle image and the depth values of respective pixels in the speckle image, and send the depth parallax map to the second processing unit 120. The second processing unit 120 may obtain the depth image according to the depth parallax map. The depth image may include the depth information of respective pixels. The second processing unit 120 may upload the depth image to the application. The application may perform image optimization, three-dimensional modeling and the like according to depth information of the face in the depth image. The second processing unit 120 may also perform living body detection according to the depth information of the face in the depth image, which may avoid that the collected face is a plane face.

With the method for processing data of the embodiment illustrated in FIG. 10, the depth information of the image may be collected accurately via the first processing unit 110, which improves the efficiency for processing data, and improves the accuracy for processing the image.

Figure 11:
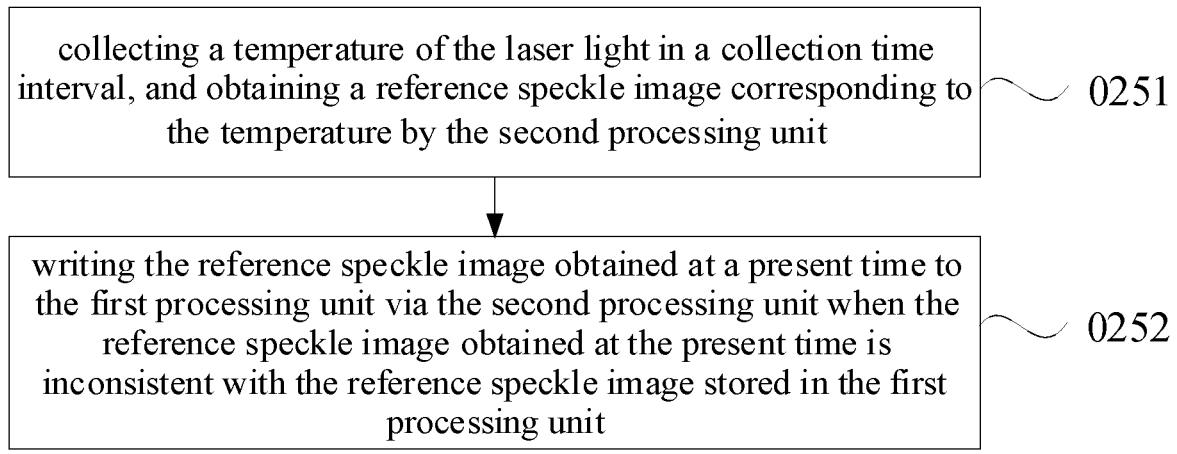

For the method for processing data of the embodiment illustrated in FIG. 8, please refer to FIG. 4, FIG. 5 and FIG. 11. Alternatively, before obtaining the stored reference speckle image at block 0241, the method for processing data further includes acts in following blocks.

At block 0251, a temperature of a laser 106 is collected every collection time period, and a reference speckle image corresponding to the temperature is obtained via the second processing unit 120.

An electronic device 100 may be provided with a temperature sensor beside a laser 106 and collect the temperature of the laser light 106 and the like through the temperature sensor. The second processing unit 120 may obtain the temperature of the laser light 106 collected by the temperature sensor every collection time period. The collection time period may be set according to the actual requirement, such as 3 seconds, 4 seconds or the like, which is not limited thereto. As the temperature of the laser light 106 changes, a camera module 101 may be deformed, affecting internal and external parameters of the laser light 106 and the laser camera 102. Effects on the camera module 101 are different under different temperatures. Therefore, reference speckle images may be different at different temperatures.

The second processing unit 120 may obtain the reference speckle image corresponding to the temperature, and process the speckle image collected under the temperature according to the reference speckle image corresponding to the temperature, to obtain the depth image. Alternatively, the second processing unit may set lots of different temperature ranges in advance, such as 0° C.~30° C., 30° C.~60° C., 60° C.~90° C. and the like, which is not limited thereto. Different temperature ranges may correspond to different reference speckle images. After collecting the temperature, the second processing unit 120 may determine the temperature range to which the collected temperature belongs, and obtain the reference speckle image corresponding to the temperature range.

At block 252, the reference speckle image obtained at the present time is written into the first processing unit 110 via the second processing unit 120 when the reference speckle image obtained at the present time is inconsistent with the reference speckle image stored in the first processing unit 110.

The second processing unit 120 may determine whether the reference speckle image obtained at the present time is consistent with the reference speckle image stored in the first processing unit 110 after obtaining the reference speckle image corresponding to the collected temperature. The reference speckle image may have an image identifier. The image identifier may be combined by one or more of numbers, letters, characters, etc. The second processing unit 120 may read the image identifier of the reference speckle image stored in the first processing unit 110, and compare the image identifier of the reference speckle image obtained at the present time with the image identifier read from the first processing unit 110. When the two image identifiers are inconsistent, it indicates that the reference speckle image obtained at the present time is inconsistent with the reference speckle image stored in the first processing unit 110, and the second processing unit 120 may write the reference speckle image obtained at the present time into the first processing unit 110. The first processing unit 110 may store the newly written reference speckle image and delete the previously stored reference speckle image.

In the method for processing data of the embodiment illustrated in FIG. 11, the reference speckle image corresponding to the temperature of the laser light 106 may be obtained, which reduces the effect of the temperature on the depth map outputted finally, and enables that the obtained depth information is more accurate.

Figure 12:
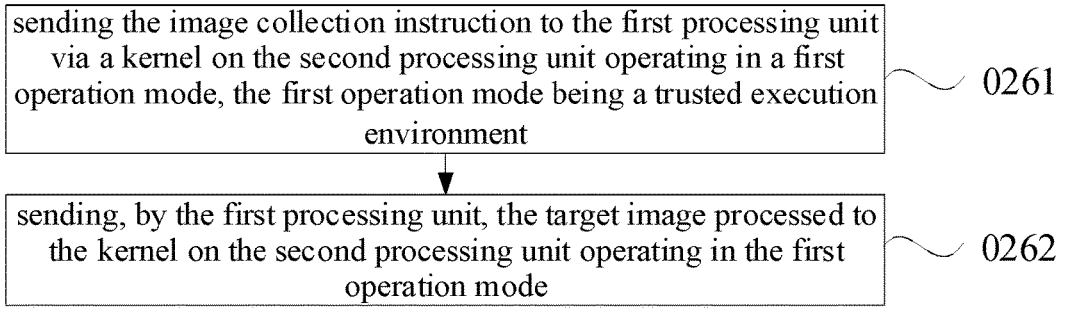

For the method for processing data of the embodiment illustrated in FIG. 8, please refer to FIG. 4, FIG. 5 and FIG. 12. Alternatively, before the act at block 021 is performed, the method for processing data further includes an act at block 0261, and sending the processed target image to the second processing unit includes an act at block 0262.

At block 0261, the image collection instruction is sent to the first processing unit 110 through a kernel of the second processing unit operating in a first operation mode. The first operation mode is a trusted execution environment.

The second processing unit 120 in the electronic device 100 may include two operation modes. The first operation mode may be a TEE. The TEE is the trusted execution environment, of which the security level is high. The second operation mode may be a REE. The REE is a rich execution environment, of which the security level is low. The second processing unit 120 may send the image collection instruction to the first processing unit 110 in the first operation mode in response to receiving a data obtaining request sent by the application. When the second processing unit 120 is a CPU with one core, the core may be directly switched from the second operation mode to the first operation mode. When the second processing unit 120 has multiple kernels, one kernel may be switched from the second operation mode to the first operation mode, and other kernels still operate in the second operation mode. The image collection instruction is sent to the first processing unit 110 through the kernel operating in the first operation mode.

At block 0262, the first processing unit 110 sends the processed target image to the kernel of the second processing unit 120 operating in the first operation mode.

The first processing unit 110 may send the processed first image to the kernel operating in the first operation mode after processing the collected first process image, which may ensure that the first processing unit 110 always operate in the trusted execution environment and improve the security. The second processing unit 120 may obtain the target image according to the processed first image in the kernel operating in the first operation mode, and process the target image according to the requirement of the application in the kernel operating in the first operation mode. For example, the second processing unit 120 may perform face detection on the target image in the kernel operating in the first operation mode.

In an embodiment, since the kernel operating in the first operation mode is unique, in response to the second processing unit 120 performing the face detection on the target image in the TEE, a serial mode may be employed to perform face recognition, face matching, living body detection and the like sequentially on the target image. The second processing unit 120 may perform the face recognition on the target image firstly. When a face is recognized, the second processing unit 120 matches the face included in the target image with a pre-stored face, to determine whether the two faces are identical. When the two faces are identical, the second processing unit 120 performs the living body detection on the face according to the target image, to prevent that the collected face is a plane face. When the face is not recognized, the face matching and the living body detection are not performed, which may reduce the process burden of the second processing unit 120.

With the method for processing data of the embodiment illustrated in FIG. 12, the image collection instruction is sent to the first processing unit 110 via the kernel of the second processing unit 120 with a high security, which may ensure that the first processing unit 110 is in an environment with a high security and improve the security of data.

Figure 13:
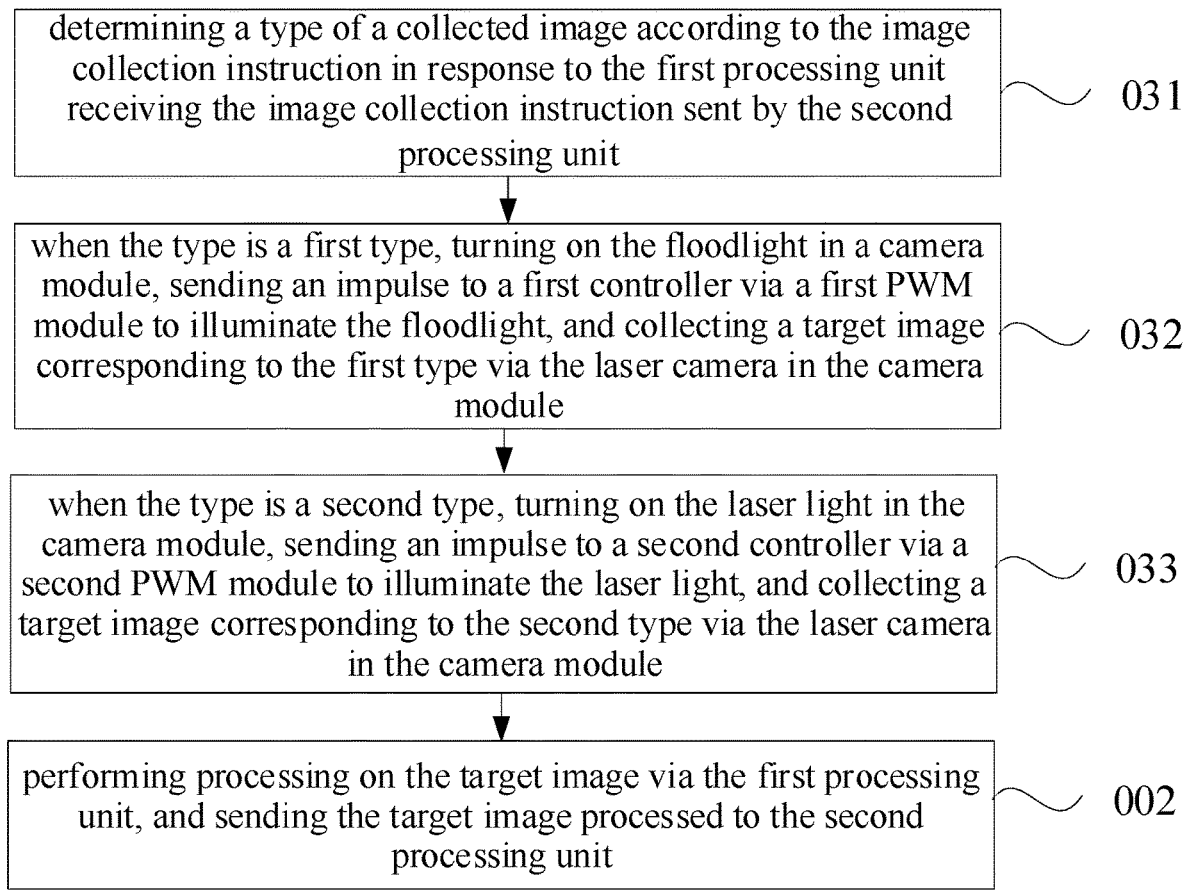
Figure 14:
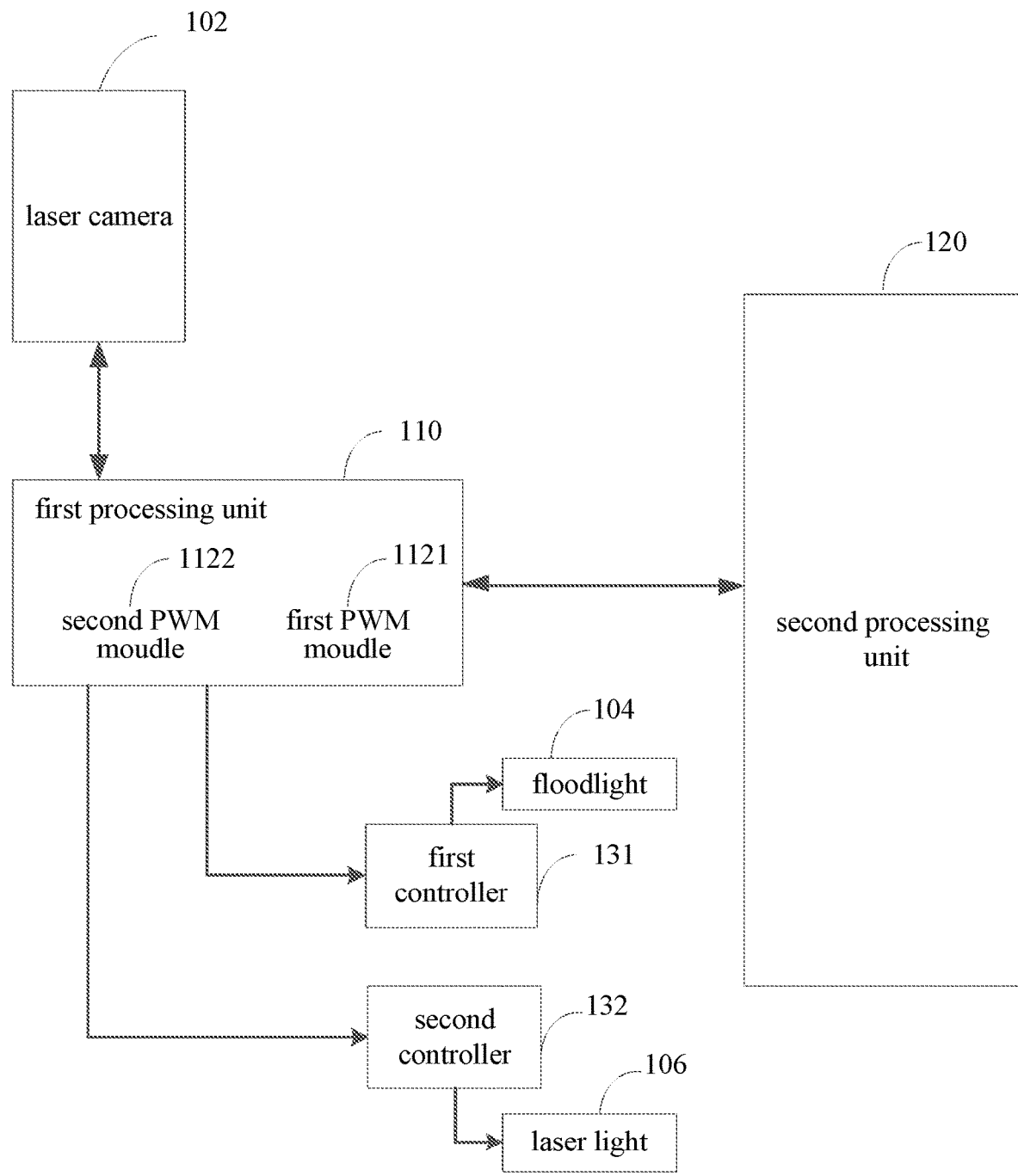
FIG. 14-FIG. 15 are application scenarios illustrating methods for processing data of one or more implementations of the present disclosure.

Please refer to FIG. 4, FIG. 13 and FIG. 14 together. In yet another embodiment, in response to the first processing unit 110 receiving the image collection instruction sent by the second processing unit 120, turning on the at least one of the floodlight 104 and the laser light 106 and operating the laser camera 102 to collect the target image at block 011 include actions in block 031, block 032 and block 033.

At block 031, a type of a collected image is determined according to the image collection instruction in response to the first processing unit 110 receiving the image collection instruction sent by the second processing unit 120.

When face data is required by an application in the electronic device 100, the application may send a data obtaining request to the second processing unit 120. The face data may include, but be not limited to, data for face verification in a scenario such as face unlocking, face payment and the like, and face depth information. The second processing unit 120 may send the image collection instruction to the first processing unit 110 after receiving the data obtaining request. The first processing unit 110 may be an MCU module, and the second processing unit may be a CPU module.

The first processing unit 110 may receive the image collection instruction sent by the second processing unit 120, and determine the image type of the image according to the image collection instruction. The image type may be one or more of the infrared image, the speckle image, the depth image and the like. The image type may be determined according to face data required by the application. The second processing unit 120 may determine the image type according to the data obtaining request after receiving the data obtaining request, and send the image collection instruction including the type of the image to the first processing unit 110. For example, when an application requires data for performing face unlocking, the second processing unit 120 may determine that the type of the image may be the infrared image or the speckle image, and when the application requires the face depth information, the second processing unit 120 may further determine that the type of the image is the depth image or the like, which is not limited herein.

At block 032, when the type is a first type, the floodlight in a camera module 101 is turned on, a pulse is sent to a first controller 131 via a first PWM module 1121 to illuminate the floodlight 104, and then a target image corresponding to the first type is collected via the laser camera 102 in the camera module 101.

When the type is the first type, in this embodiment, the first type may be the infrared image, the first processing unit 110 may send a control instruction to the first controller 131. The instruction may be configured to turn on the floodlight 104 in the camera module 101. The first processing unit 110 may send a pulse signal to the first controller 131 configured to control the floodlight 104 via the first PWM module 1121, to illuminate the floodlight 104. Alternatively, the first PWM module 1121 may sent pulse signals continuously to the floodlight 104 based on a certain voltage amplitude and a certain time interval, to illuminate the floodlight 104. The floodlight 104 may be a surface light source irradiating uniformly in all directions. When the floodlight 104 is illuminated, red light may be emitted, and the laser camera 102 may collect the red light fed back the face to obtain the infrared image.

At block 033, when the type is a second type, the laser light 106 in the camera module 102 is turned on, a pulse is sent to a second controller 132 via a second PWM module 1122 to illuminate the laser light 106, and then a target image corresponding to the second type is collected via the laser camera 102 in the camera module 101.

When the type is the second type, in this embodiment, the second type may be the speckle image or the depth image, the first processing unit 110 may send a control instruction to the second controller 132. The control instruction may be configured to turn on the laser light 106 in the camera module 101. The first processing unit 110 may send a pulse signal to the second controller 132 configured to control the laser light 106 via the second PWM module 1122, to illuminate the laser light 106. Alternatively, the second PWM module 1122 may send pulse signals continuously to the laser light 106 based on a certain voltage amplitude and a certain time interval, to illuminate the laser light 106. When the laser light 106 is illuminated, the emitted laser may be diffracted by a lens and diffractive optical elements (DOE) to generate an image with speckle particles. After the image with the speckle particles is projected to the target image, the image with the speckle particles generate offsets of the particles as distances between respective points of the target image and the electronic device 100 are different, and the laser camera 102 collects the image after the speckle particles offset, to obtain the speckle image.

At block 002, the target image is processed by the first processing unit 110, and the processed target image is sent to the second processing unit 120.

The laser camera 102 may send the collected target image to the first processing unit 110, and the first processing unit 110 may perform processing on the target image. The target image may include the infrared image, the speckle image and the like. After an image type is determined according to the image collection instruction, the first processing unit 110 may perform corresponding processing on the target image based on the determined type of the collected image and the target image corresponding to the type. When the type of the collected image is the infrared image, the first processing unit 110 may send the pulse to the first controller 131 via the first PWM module 1121 to illuminate the floodlight 104, collect the infrared image via the laser camera 102, and perform processing on the infrared image to obtain an infrared parallax map. When the image type is a speckle image, the first processing unit 110 may send the pulse to the second controller 132 via the second PWM module to illuminate the laser light 106, collect the speckle image via the laser camera 102, and perform processing on the speckle image to obtain a speckle parallax image. When the type of the collected image is a depth image, the first processing unit 110 may collect the speckle image, and perform processing on the collected speckle image to obtain a depth parallax map.

Further, the first processing unit 110 may perform correction on the target image. Performing the correction refers to correct image content offset of the target image caused by internal parameters and external parameters of the laser camera 102 and the red green blue (RGB) camera 108, such as image content offset caused by a deflection angle of the laser camera 102, and position layout between the laser camera 102 and the RGB camera 108. A parallax map of the target image may be obtained after the first processing unit 110 performs the correction on the target image. For example, the correction may be performed on the infrared image to obtain the infrared parallax map, and the correction may be performed on the speckle image to obtain the speckle parallax map or the depth parallax map. The first processing unit 110 performs the correction on the target image may avoid a condition that an image finally presented on the display of the electronic device 100 appears ghosting.

The first processing unit 110 performs processing on the target image, and may send the processed target image to the second processing unit 120. The second processing unit 120 may obtain a requirement image based on the processed target image, such as the infrared image, the speckle image, the depth image and the like. The second processing unit 120 may perform further processing on the image needed according to requirement of the application.

For example, when an application needs to perform the face verification, the second processing unit 120 may perform the face detection on a required image obtained and the like. The face detection may include face recognition, face matching and living body detection. The face recognition refers to recognize whether there is a face in the target image. The face matching refers to match the face in the required image with a preset face. The living body detection refers to detect whether the face in the target image is biologically active. When the application needs to obtain depth information of the face, the generated target depth image may be uploaded to the application. The application may perform image optimization process, three-dimensional modeling and the like according to the received target depth image.

With the method for processing data of the embodiment illustrated in FIG. 13, in response to the first processing unit 110 receiving the image collection instruction sent by the second processing unit 120, the type of the collected image is determined according to the image collection instruction. When the type is the first type, the floodlight 104 is illuminated via the first PWM module 1121, and the target image corresponding to the first type is collected via the laser camera 102. When the image type is the second type, the pulse is sent to the second controller 132 via the second PWM module 1122 to illuminate the laser light 106, and the target image corresponding to the second type is collected via the laser camera 102. The floodlight 104 and the laser light 106 are controlled respectively via two PWM modules, which do not need to switch in real time, may reduce complexity for processing data, and reduce the process pressure of the first processing unit 110.

FIG. 14 is an application scenario illustrating the method for processing data of the embodiment illustrated in FIG. 13. As illustrated in FIG. 14, the method for processing data may be applied to the electronic device 100. The electronic device 100 includes a laser camera 102, a floodlight 104, a laser light 106, a first processing unit 110, a second processing unit 120 and a first controller 131 and a second controller 132. The first processing unit 110 may be coupled to the laser camera 102 and the second processing unit 120 respectively. The first processing unit 110 may be a MCU module or the like. The second processing unit 120 may be a CPU module or the like. The first controller 131 may be coupled to the floodlight 104. The second controller 132 may be coupled to the laser light 106. The first processing unit 110 may include a first PWM module 1121 and a second PWM module 1122. The first processing unit 110 may be coupled to the first controller 131 via the first PWM module 1121. The first processing unit 110 is coupled to the second controller 132 via the second PWM module 1122.

The first processing unit 110 determines the image type according to an image collection instruction in response to receiving the image collection instruction sent by the second processing unit 120. When the image type is a first type, the floodlight 104 is turned on, a pulse is sent to the first controller 131 via the first PWM module 1121 to illuminate the floodlight 104, and a target image corresponding to the first type is collected via the laser camera 102. When the type of the image is a second type, the laser light 106 is turned on, a pulse is sent to the second controller 132 via the second PWM module 1122 to illuminate the laser light 106, and a target image corresponding to the second type is collected via the laser camera 102. The first processing unit 110 may perform processing on the target image collected by the laser camera 102, and send the processed target image to the second processing unit 120.

FIG. 4 is an application scenario illustrating the method for processing data of the embodiment illustrated in FIG. 13. As illustrated in FIG. 4, the electronic device 100 may include a camera module 101, a second processing unit 120, and a first processing unit 110. The second processing unit 120 may be a CPU module. The first processing unit 110 may be an MCU module or the like. The first processing unit 110 is coupled between the second processing unit 120 and the camera module 101. The first processing unit 110 may control a laser camera 101, a floodlight 104 and a laser light 106 in the camera module 101. The second processing unit 120 may control an RGB camera 108 in the camera module 101.

The camera module 101 includes a laser camera 102, a floodlight 104, the RGB camera 108 and a laser light 106. The laser camera 102 may be an infrared camera, and may be configured to obtain an infrared image. The floodlight 104 may be a surface light source that can emit infrared light. The laser light 106 may be a point light source with a pattern that can emit laser light. The laser camera 212 may obtain the infrared image according to reflected light when the floodlight 104 emits the infrared light. The laser camera 106 may obtain a speckle image according to reflected light when the laser light 106 emits the laser light. The speckle image is an image with a distorted pattern after a laser forming a pattern and emitted by the laser light 106 is reflected.

The second processing unit 120 may include a CPU kernel operating under a trusted execution environment (TEE) and a CPU kernel operating under a rich execution environment (REE). Both the TEE and the REE are operation modes of an advanced RISC machines (ARM) module. The REE has a higher security level. The second processing unit 120 only has one CPU kernel which may operate under the TEE at the same time. In general, an operation behavior with a high security level in the electronic device 100 needs to be executed in the CPU kernel under the TEE. An operation behavior with a low security level may be executed in the CPU kernel under the REE.

The first processing unit 110 includes a pulse width modulation (PWM) module 112, a serial peripheral interface/inter-integrated circuit (SPI/I2C) interface 114, a random access memory (RAM) module 116 and a depth engine 118. The PWM module 232 may include a first PWM module and a second PWM module 1122. The first PWM module 1121 may be coupled to a controller 131 of the floodlight 104 to control the floodlight 104 to be turned on, and emit a pulse to the floodlight 104 to illuminate the floodlight 104. The second PWM module 1122 may be coupled to the controller 132 of the laser light 106 to control the laser light 106 to be turned on, and emit a pulse to the laser light 106 to illuminate the laser light 106. The SPI/I2C interface 114 may be configured to receive the image collection instruction sent by the second processing unit 120. The depth engine 118 may process the speckle image to obtain a depth parallax map.

In response to the second processing unit 120 receiving a data obtaining request of an application, for example, when the application needs to perform face unlocking or face payment, the image collection instruction may be sent to the first processing unit 110 through the CPU kernel operating under the TEE. In response to receiving the image collection instruction, the first processing unit 110 may emit pulses to illuminate the floodlight 104 via the first PWM module 1121 in the PWM module 112 and collect the infrared image via the laser camera 102, and the first processing unit 110 may emit pulses to illuminate the laser light 106 via the second PWM module 1122 in the PWM module 112 and collect the speckle image via the laser camera 102. The camera module 101 may send the collected infrared image and the collected speckle image to the first processing unit 110. The first processing unit 110 may process the received infrared image to obtain an infrared parallax map and process the received speckle image to obtain a speckle parallax map or a depth parallax map. The first processing unit 110 processes the received infrared image and the received speckle image as follows. The first processing unit 110 performs correction on the received infrared image or the received speckle image, to remove effects caused by internal parameters and external parameters in the camera module 101 on the received images. The first processing unit 110 may be set to different modes, and different images are outputted in different modes. When the first processing unit 110 is set to a speckle image mode, the first processing unit 110 processes the speckle image to obtain the speckle parallax map, according to which, a target speckle image may be obtained. When the first processing unit 110 is set to a depth image mode, the first processing unit 110 processes the speckle image to obtain the depth parallax map, according to which, a depth image may be obtained. The depth image refers to an image with depth information. The first processing unit 110 may send the infrared parallax map and the speckle parallax map to the second processing unit 120. The first processing unit 110 may also send the infrared parallax map and the depth parallax map to the second processing unit 120. The second processing unit 120 may obtain the target infrared image according to the infrared parallax map and obtain the depth image according to the depth parallax map. Further, the second processing unit 120 may perform face recognition, face matching and living body detection, and obtain depth information of the detected face according to the target infrared image and the depth image.

The first processing unit 110 communicates with the second processing unit 120 through a fixed security interface, to ensure security for transmitting data. As illustrated in FIG. 4, the second processing unit 120 sends data to the first processing unit 110 through a SECURE SPI/I2C 130, and the first processing unit 110 sends data to the second processing unit 120 through a SECURE mobile industry processor interface (MIPI) 140.

Alternatively, the first processing unit 110 may also obtain the target infrared image according to the infrared parallax map, obtain the depth image according to the depth parallax map, and send the target infrared image and the depth image to the second processing unit 120.

For the method for processing data of the embodiment illustrated in FIG. 13, in combination with FIG. 4 and FIG. 14, alternatively, before determining the image type according to the image collection instruction in response to the first processing unit 110 receiving the image collection instruction sent by the second processing unit 120 at block 031, the method further includes: configuring, by the second processing unit 120, the floodlight 104 and the laser light 106 respectively via the I2C bus when it is detected that the camera module 101 is activated.

When an application of the electronic device 100 needs to collect required image data via the camera module 101, the camera module 101 may be activated, and the image is collected via the camera module 101. When the electronic device 100 detects that the camera module 101 is activated, the second processing unit 120 may configure the floodlight 104 and the laser light 106 via the I2C bus respectively. The I2C bus may implement data transmission among respective devices connected to the bus I2C via a data line and a clock line. The second processing unit 120 may read a configured file firstly and perform configuration on the floodlight 104 and the laser light 106 according to parameters included in the configured file. The configured file may record the parameters such as emission powers, emission currents and the like of the floodlight 104 and the laser light 106, but is not limited thereto, and may be other parameters. The second processing unit 120 may set the parameters such as the emission powers, the emission currents and the like of the floodlight 104 and the laser light 106 according to the parameters in the configured file.

For the method for processing data of the embodiment illustrated in FIG. 13, alternatively, the second processing unit 120 may be coupled to the floodlight 104 and the laser light 106 respectively via a same I2C bus. The floodlight 104, the laser light 106 and the second processing unit 120 may be coupled to the same I2C bus. When the configuration is performed on the floodlight 104 and the laser light 106, the second processing unit 120 may perform addressing on the floodlight 104 via the I2C and perform the configuration on the floodlight 104, and then the second processing unit 120 may perform the addressing on the laser light 106 via the I2C bus and perform the configuration on the laser light 106. Alternatively, the second processing unit 120 may also perform the addressing on the laser light 106 via the I2C bus firstly and perform the configuration on the laser light 106, and then the second processing unit 120 may perform the addressing on the floodlight 104 via the I2C bus and perform the configuration on the floodlight 104. Time division multiplexing may be performed on the coupled same I2C bus, which may reduce the complexity for controlling the circuit, save sources and reduce the costs.

For the method for processing data of the embodiment illustrated in FIG. 13, alternatively, the second processing unit 120 may also be coupled to the floodlight 104 and the laser light 106 via two I2C buses respectively. The second processing unit 120 may be coupled to the floodlight 104 via one I2C bus and to the laser light 106 via the other I2C bus. When performing the configuration on the floodlight 104 and the laser light 106, the second processing unit 120 may perform the addressing on the floodlight 104 via the I2C bus coupled to the floodlight to configure the floodlight 104, and the second processing unit 120 may perform addressing on the laser light 106 via the I2C bus coupled to the laser light 106 to configure the laser light 106 simultaneously. The floodlight 104 and the laser light 106 are coupled respectively via two I2C buses, and the configuration may be performed on the floodlight 104 and the laser light 106 in parallel, which improve the velocity for processing data.

Figure 15:
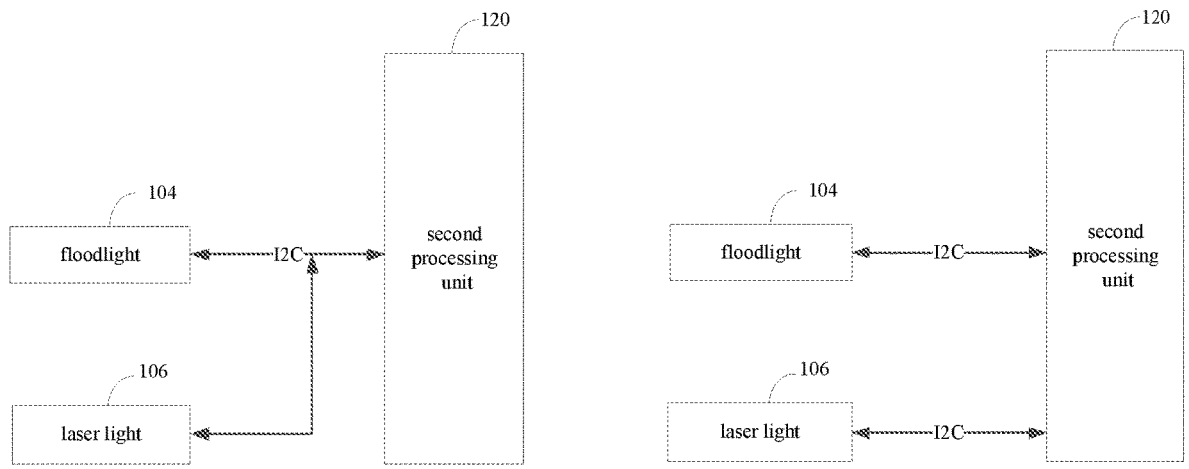

FIG. 15 is a schematic diagram illustrating a second processing unit 120 being coupled to a floodlight 104 and a laser light 106 according to an embodiment. As illustrated in FIG. 15, in sub-graph (1), the second processing unit 120 is coupled to the floodlight 104 and the laser light 106 respectively via an I2C bus. In sub-graph (2), the second processing unit 120 is coupled to the floodlight 104 and the laser light 106 respectively via two I2C buses. The second processing unit 120 may be coupled to the floodlight 104 via one I2C bus, and to the laser light 106 via the other I2C bus.

For the method for processing data of the embodiment illustrated in FIG. 15, when the camera module 101 is activated, the second processing unit 120 may perform the configuration on the floodlight 104 and the laser light 106 via the I2C bus, which may control the image collection more accurately and improve the efficiency of data processing.

For the method for processing data of the embodiment illustrated in FIG. 13, alternatively, please refer to FIG. 14. A time point at which the first PWM module 1121 sends the pulse to the first controller 131 is different from a time point at which the second PWM module 1122 sends the pulse to the second controller 132, and a time interval between the time point at which the first PWM module 1121 sends the pulse to the first controller 131 and the time point at which the second PWM module 1122 sends the pulse to the second controller 132 is smaller than a time threshold.

The first processing unit 110 determines the image type of the collected image according to the image collection instruction. There may be two image types. For example, the image types may include a first type and a second type. When the type of the collected image includes the infrared image and the speckle image simultaneously, or includes the speckle image and the depth image simultaneously, there is a need to collect the infrared image and the speckle image simultaneously. The first processing unit 110 may send the pulse to the first controller 131 via the first PWM module 121 and send the pulse to the second controller 132 via the second PWM module 1122, to illuminate the floodlight 104 and the laser light 106. The time point at which the first PWM module 1121 sends the pulse to the first controller 131 may be different from the time point at which the second PWM module 1122 sends the pulse to the second controller 132, thus illuminating the floodlight 104 and the laser light 106 at different time points. The first processing unit 110 may collect the infrared image via the laser camera 102 when the first PWM module 1121 sends the pulse to the first controller 131, and collect the speckle image via the laser camera 102 when the second PWM module 1122 sends the pulse to the second controller 132.

Alternatively, the time interval between the time point at which the first PWM module 1121 sends the pulse to the first controller 131 and the time point at which the second PWM module 1122 sends the pulse to the second controller 132 is smaller than the time threshold. The laser camera 102 may collect the speckle image in the time interval which is smaller than the time threshold after collecting the infrared image, such that image content of the collected infrared image is consistent with image content of the collected speckle image, and subsequent processing such as face detection is performed conveniently. The time threshold may be set based on an actual requirement, such as 20 milliseconds, 30 milliseconds or the like. In this embodiment, the first processing unit 110 may collect the infrared image and the speckle image respectively via the laser camera 102 at different time points, which may ensure that the image content of the collected infrared image is consistent with the image content of the collected speckle image, and improve the accuracy of subsequent face detection.

Figure 16:
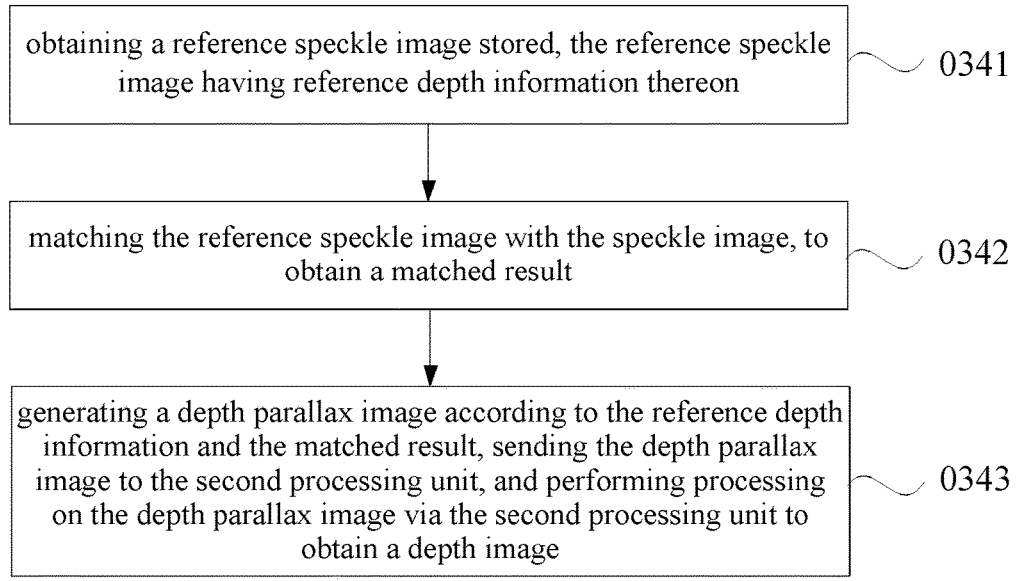

With the method for processing data of the embodiment illustrated in FIG. 13, in combination with FIG. 14 and FIG. 16, alternatively, performing the processing on the target image via the first processing unit 110 and sending the processed target image to the second processing unit 120 at block 002 include actions in following blocks.

At block 0341, a reference speckle image stored is obtained, and the reference speckle image has reference depth information thereon.

In a camera coordinate system, line perpendicular to an imaging plane and passing through a center of a mirror is taken as Z axis. When a coordinate of an object in the camera coordinate system is (X, Y, Z), Z value is the depth information of the object in the imaging plane of the camera. When an application needs to obtain depth information of a face, a depth image including the depth information of the face needs to be collected. The first processing unit 110 may control a laser light 106 to be turned on via the I2C bus, and operate the laser camera 102 to collect a speckle image via the I2C bus. The first processing unit 110 may store the reference speckle image in advance. The reference speckle image may have the reference depth information. Depth information of respective pixels included in the speckle image may be obtained according to the collected speckle image and the reference speckle image.

At block 0342, the reference speckle image is matched with the speckle image, to obtain a matched result.

The first processing unit 110 may take respective pixels included in the collected speckle image as the center successively, and select one pixel block with a preset size, such as a pixel size with 31 pixels*31 pixels, and search for a block in the reference speckle image which matches the selected pixel block. The first processing unit 110 may find two points on a same laser light path respectively in the speckle image and the reference speckle image from the selected pixel block in the collected speckle image and the matched block in the reference speckle image. Speckle information of the two points on the same laser light path is consistent. The two points on the same laser light path may be identified as corresponding pixels. In the reference speckle image, depth information of the points on each laser light path is known. The first processing unit 110 may calculate offset between the two corresponding pixels on the same laser light path in the target speckle image and the reference speckle image, and obtain the depth information of respective pixels included in the collected speckle image according to the offset.

In an embodiment, the first processing unit 110 calculates the offset between the collected speckle image and the reference speckle image, and obtains the depth information of respective pixels included in the speckle image according to the offset by the following formula (3).

$$Z_D = \frac{L \times f \times Z_0}{L \times f + Z_0 \times P}, \tag{3}$$

where $Z_D$ represents depth information of a pixel, i.e., a depth value of the pixel; L represents a distance between the laser camera 102 and the laser (i.e., the laser light 106); f represents a focal length of a lens in the laser camera 102; $Z_0$ represents a depth value between a reference plane and the laser camera 102 of the electronic device 100 when the reference speckle image is collected; P represents the offset between the corresponding pixels in the collected speckle image and the reference speckle image; P may be obtained by multiplying the number of offset pixels between the target speckle image and the reference speckle image by an actual distance of one pixel. When a distance between the target object and the laser camera 102 is greater than a distance between the reference plane and the laser camera 102, P is a negative value. When the distance between the target object and the laser camera 102 is less than the distance between the reference plane and the laser camera 102, P is a positive value.

At block 0343, a depth parallax map is generated according to the reference depth information and the matched result, the depth parallax map is sent to the second processing unit 120, and processing is performed on the depth parallax map via the second processing unit 120 to obtain a depth image.

The first processing unit 110 may perform correction on the collected speckle image after obtaining the depth information of respective pixels included in the collected speckle image, to correct image content offset of the collected speckle image caused by internal parameters and external parameters of the laser camera 102 and the RGB camera 108. The first processing unit 110 may generate the depth parallax map according to the corrected speckle image and the depth values of respective pixels in the speckle image, and send the depth parallax map to the second processing unit 120. The second processing unit 120 may obtain the depth image according to the depth parallax map. The depth image may include the depth information of respective pixels. The second processing unit 120 may upload the depth image to the application. The application may perform image optimization, three-dimensional modeling and the like according to depth information of the face in the depth image. The second processing unit 120 may also perform living body detection according to the depth information of the face in the depth image, which may avoid that the collected face is a face in a plane picture.

With the method for processing data of the embodiment illustrated in FIG. 16, the depth information of the collected image may be obtained accurately via the first processing unit 110, which may improve the efficiency for processing data and improve the accuracy for processing the image.

For the method for processing data of the embodiment illustrated in FIG. 13, please refer to FIG. 14 and FIG. 17. Alternatively, before obtaining the stored reference speckle image at block 0341, the method for processing data further includes actions in following blocks.

At block 0351, a temperature of a laser 106 is collected every collection time period, and a reference speckle image corresponding to the temperature is obtained via the second processing unit 120.

An electronic device 100 may be provided with a temperature sensor beside a laser light 106 and collect the temperature of the laser light 106 and the like through the temperature sensor. The second processing unit 120 may obtain the temperature of the laser light 106 collected by the temperature sensor every collection time period. The collection time period may be set according to the actual requirement, such as 3 seconds, 4 seconds or the like, which is not limited thereto. As the temperature of the laser light 106 changes, a camera module 101 may be deformed, affecting internal and external parameters of the laser light 106 and the laser camera 102. Effects on the camera module 101 are different under different temperatures. Therefore, reference speckle images may be different at different temperatures.

The second processing unit 120 may obtain the reference speckle image corresponding to the temperature, and process the speckle image collected under the temperature according to the reference speckle image corresponding to the temperature, to obtain the depth image. Alternatively, the second processing unit may set lots of different temperature ranges in advance, such as 0° C.~30° C., 30° C.~60° C., 60° C.~90° C. and the like, which is not limited thereto. Different temperature ranges may correspond to different reference speckle images. After collecting the temperature, the second processing unit 120 may determine the temperature range to which the collected temperature belongs, and obtain the reference speckle image corresponding to the temperature range.

At block 0252, the second processing unit 120 writes the reference speckle image obtained at the present time into the first processing unit 110 when the reference speckle image obtained at the present time is inconsistent with the reference speckle image stored in the first processing unit 110.

The second processing unit 120 may determine whether the reference speckle image obtained at the present time is consistent with the reference speckle image stored in the first processing unit 110 after obtaining the reference speckle image corresponding to the collected temperature. The reference speckle image may have an image identifier. The image identifier may be combined by one or more of numbers, letters, characters, etc. The second processing unit 120 may read the image identifier of the reference speckle image stored in the first processing unit 110, and compare the image identifier of the reference speckle image obtained at the present time with the image identifier read from the first processing unit 110. When the two image identifiers are inconsistent, it indicates that the reference speckle image obtained at the present time is inconsistent with the reference speckle image stored in the first processing unit 110, and then the second processing unit 120 may write the reference speckle image obtained at the present time into the first processing unit 110. The first processing unit 110 may store the newly written reference speckle image and delete the previously stored reference speckle image.

With the method for processing data of the embodiment illustrated in FIG. 17, the reference speckle image corresponding to the temperature may be obtained according to the laser light 106, which may reduce the effect of the temperature on the depth map outputted finally and enable that the obtained depth information is more accurate.

The method for processing data provided in the present disclosure includes following acts.

At block 001: in response to a first processing unit 110 receiving an image collection instruction sent by a second processing unit 120, at least one of a floodlight 104 and a laser light 106 are turned on, and a laser camera 102 is operated to collect a target image.

At block 002: processing is performed on the target image via the first processing unit 110, and the target image processed is sent to the second processing unit 120.

In an embodiment, the act in block 001 includes acts in blocks 011 and 012. At block 011, in response to the first processing unit 110 receiving the image collection instruction sent by the second processing unit 120, a control instruction is sent to a controller 130 via an inter-integrated circuit (I2C) bus. The control instruction is configured to turn on the at least one of the floodlight 104 and the laser light 106.

Alternatively, the act in block 001 includes: determining a type of a collected image according to the image collection instruction; sending, by the first processing unit 110, a first control instruction to the controller 130 via the I2C bus when the type is a first type, the first control instruction being configured to instruct the controller 130 to turn on the floodlight 104; and sending, by the first processing unit 110, a second control instruction to the controller 130 via the I2C bus when the type is a second type, the second control instruction being configured to instruct the controller 130 to turn on the laser light 106.

Alternatively, after determining the type of the collected image according to the image collection instruction, the method for processing data further includes: when the type includes the first type and the second type, sending, by the first processing unit 110, the first control instruction to the controller 130 via the I2C bus, to turn on the floodlight 104; and after the laser camera 102 collects a target image corresponding to the first type, sending the second control instruction to the controller 130 via the I2C bus, to turn on the laser light 106.

Alternatively, after determining the type of the collected image according to the image collection instruction, the method for processing data further includes: when the type includes the first type and the second type, sending, by the first processing unit 110, the second control instruction to the controller 130 via the I2C bus, to turn on the laser light 106; and after the laser camera 102 collects a target image corresponding to the second type, sending the first control instruction to the controller 130 via the I2C bus, to turn on the floodlight 104.

Alternatively, a time interval between a time point at which the first processing unit 110 sends the first control instruction and a time point at which the first processing unit 110 sends the second processing instruction is smaller than a time threshold.

At block 012, a pulse is sent to the controller 130 via a pulse width modulation (PWM) module 112 to illustrate the at least one of the floodlight 104 and the laser light 106 being turned up, and the target image is collected via the laser camera 102.

Alternatively, the first processing unit 110, the controller 130 and the laser camera 102 are coupled to the same I2C bus. The act of collecting the target image by the laser camera may include: the laser camera 102 is operated to collect the target image via the I2C bus.

At block 002, processing is performed on the target image via the first processing unit 110, and the target image processed is sent to the second processing unit 120.

Alternatively, the target image includes a speckle image. The act in block 002 includes: obtaining a reference speckle image stored, the reference speckle image having reference depth information thereon; matching the reference speckle image with the speckle image, to obtain a matched result; and generating a depth parallax map according to the reference depth information and the matched result, sending the depth parallax map to the second processing unit, and performing processing on the depth parallax map via the second processing unit to obtain a depth image.

In this embodiment, in response to receiving the image collection instruction sent by the second processing unit 120, the first processing unit 110 sends the control instruction to the controller 130 via the I2C bus to control the at least one of the floodlight 104 and the laser light 106 to be turned on, sends the pulse to the controller 130 via the PWM module 112 to illuminate the at least one of the floodlight 104 and the laser light 106, and performs the processing on the target image after collecting the target image, thus controlling the floodlight 104 and the laser light 106 via the controller 130, which may reduce the complexity for controlling the floodlight 104, the laser light 106 and the like, and save costs.

In another embodiment, step 001 includes acts in blocks 021 and 022. The method for processing data of this embodiment may be applied to an electronic device 100. The electronic device 100 includes a camera module 101, a first processing unit 110 and a second processing unit 120. The first processing unit 110 is coupled to the second processing unit 120 and the camera module 101 respectively. The camera module 101 includes a laser camera 102, a floodlight 104 and a laser light 106. The laser camera 102, the floodlight 104, the laser light 106 and the first processing unit 110 are coupled to a same I2C bus.

At block 021, in response to the first processing unit 110 receiving the image collection instruction sent by the second processing unit 120, the at least one of the floodlight 104 and the laser light 106 is turned on via an I2C bus.

Alternatively, the electronic device 100 further includes a controller 130. The controller 130 is configured to control the floodlight 104 and the laser light 106, and the controller 130 is coupled to the I2C bus. Step 021 includes: determining a type of a collected image according to the image collection instruction; sending, by the first processing unit 110, a first control instruction to the controller 130 via the I2C bus when the type is an infrared image, the first control instruction being configured to instruct the controller 130 to turn on the floodlight 104; and sending, by the first processing unit 110, a second control instruction to the controller 130 via the I2C bus when the type is a speckle image or a depth image, in which the second control instruction is configured to instruct the controller 130 to turn on the laser light 106.

Alternatively, after determining the type of the collected image according to the image collection instruction, the method for processing data further includes: when the type includes the infrared image and the speckle image, or includes the infrared image and the depth image, sending, by the first processing unit 110, the first control instruction to the controller 130 via the I2C bus to turn on the floodlight 104, controlling the laser camera 102 to collect the infrared image via the I2C bus, sending the second control instruction to the controller 130 via the I2C bus to turn on the laser light 106, and operating the laser camera 102 to collect the speckle image via the I2C bus.

Alternatively, after determining the type of the collected image according to the image collection instruction, the method for processing data further includes: when the type includes the infrared image and the speckle image, or includes the infrared image and the depth image, sending, by the first processing unit 110, the second control instruction to the controller 130 via the I2C bus to turn on the laser light 106, operating the laser camera 102 to collect the speckle image via the I2C bus, sending the first control instruction to the controller 130 via the I2C bus to turn on the floodlight 104, and operating the laser camera 102 to collect the infrared image via the I2C bus.

At block 022, the first processing unit 110 operates the laser camera 102 to collect the target image via the I2C bus.

At block 002, processing is performed on the target image via the first processing unit 110, and the target image processed is sent to the second processing unit 120.

Alternatively, the act in block 002 includes: obtaining a reference speckle image stored, the reference speckle image having reference depth information thereon; matching the reference speckle image with the speckle image, to obtain a matched result; and generating a depth parallax map according to the reference depth information and the matched result, sending the depth parallax map to the second processing unit 120, and performing processing on the depth parallax map via the second processing unit 120 to obtain a depth image.

Alternatively, before obtaining the reference speckle image stored, the method for processing data further includes: collecting a temperature of the laser light 106 in a collection time interval, and obtaining a reference speckle image corresponding to the temperature by the second processing unit 120; and writing the reference speckle image obtained at a present time to the first processing unit 110 via the second processing unit 120 when the reference speckle image obtained at the present time is inconsistent with the reference speckle image stored in the first processing unit 110.

Alternatively, before act at block 021 is performed, the method for processing data further includes: sending the image collection instruction to the first processing unit 110 via a kernel on the second processing unit 120 operating in a first operation mode, the first operation mode being a trusted execution environment. Step 002 includes: sending, by the first processing unit 110, the target image processed to the kernel on the second processing unit 120 operating in the first operation mode.

In this embodiment, the laser camera 102, the floodlight 104, the laser camera 106 and the first processing unit 110 are coupled to the same I2C bus. The first processing unit 110 controls the at least one of the floodlight 104 and the laser light 106 to be turned on via the I2C bus, operates the laser camera 102 to collect the target image via the I2C bus, and controls the floodlight 104, the laser light 106 and the laser camera 102 via the same I2C bus. In this way, the I2C bus may be multiplexed, which may reduce the complexity of the control circuit and reduce costs.

In an embodiment, the act in block 001 includes acts in blocks 031, 032 and 023.

At block 031, a type of a collected image is determined according to the image collection instruction in response to the first processing unit 110 receiving the image collection instruction sent by the second processing unit 120.

Alternatively, the second processing unit 120 is coupled to the floodlight 104 and the laser light 106 respectively via an I2C bus; and before the act in at block 031 is performed, the method further includes: configuring, by the second processing unit 120, the floodlight 104 and the laser light 106 respectively via the I2C bus when it is detected that the camera module 101 starts up.

Alternatively, the second processing unit 120 is coupled to the floodlight 104 and the laser light 106 respectively via the same I2C bus.

Alternatively, the second processing unit 120 is coupled to the floodlight 104 via an I2C bus, and coupled to the laser light 106 via another I2C bus.

At block 032, when the type is a first type, the floodlight 104 in a camera module 101 is turned on, a pulse is sent to a first controller 131 via a first PWM module 1121 to illuminate the floodlight 104, and a target image corresponding to the first type is collected via the laser camera 102 in the camera module 101.

At block 032, when the type is a second type, the laser light 106 in the camera module 101 is turned on, a pulse is sent to a second controller 132 via a second PWM module 1122 to illuminate the laser light 106, and a target image corresponding to the second type is collected via the laser camera 102 in the camera module 101.

Alternatively, a time point at which the first PWM module 1121 sends the pulse to the first controller 131 is different from a time point at which the second PWM module 1122 sends the pulse to the second controller 132, and a time interval between the time point at which the first PWM module 1121 sends the pulse to the first controller 131 and the time point at which the second PWM module 1122 sends the pulse to the second controller 132 is smaller than a time threshold.

At block 002, the target image is processed by the first processing unit 110, and the target image processed is sent to the second processing unit 120.

Alternatively, the target image includes a speckle image. The act at block 002 includes: obtaining a reference speckle image stored, the reference speckle image having reference depth information thereon; matching the reference speckle image with the speckle image, to obtain a matched result; and generating a depth parallax map according to the reference depth information and the matched result, sending the depth parallax map to the second processing unit 120, and performing processing on the depth parallax map via the second processing unit 120 to obtain a depth image.

Alternatively, before obtaining the reference speckle image stored, the method for processing data further includes: collecting a temperature of the laser light 106 in a collection time interval, and obtaining a reference speckle image corresponding to the temperature by the second processing unit 120; and writing the reference speckle image obtained at a present time to the first processing unit 110 via the second processing unit 120 when the reference speckle image obtained at the present time is inconsistent with the reference speckle image stored in the first processing unit 110.

In this embodiment, in response to receiving the image collection instruction sent by the second processing unit 120, the first processing unit 110 determines the type of the collected image according to the image collection instruction. When the type of the collected image is the first type, the floodlight 104 is illuminated via the first PWM module 1121 and the target image corresponding to the first type is collected via the laser camera 102. When the type of the collected image is the second type, the pulse is sent to the second controller 132 via the second PWM module 1122 to illuminate the laser light 106 and the target image corresponding to the second type is collected via the laser camera 102. The floodlight 104 and the laser light 106 may be controlled respectively via the two PWM modules, there is no need to switch in real time, the complexity for processing data may be reduced, and the process pressure of the first processing unit 110 is reduced.

It should be understood that, although respective steps in respective flow charts are sequentially displayed as indicated by the arrows, these steps are not necessarily performed in the order indicated by the arrows. Unless expressly stated in the present disclosure, there is no strict ordering for the execution of these steps, and these steps may be performed in other orders. Moreover, at least parts of the steps in the various flow charts above may include multiple sub-steps or multiple stages. Such sub-steps or stages are not necessarily performed at the same time, but may be executed at different times. These sub-steps or stages are not necessarily performed sequentially, but may be performed in turn or alternately with at least a portion of other steps or sub-steps or stages of other steps.

FIG. 18 is a block diagram illustrating an electronic device 100 in an embodiment. As illustrated in FIG. 18, the electronic device 100 includes a processor 20, a memory 30, a display 40 and an input apparatus 50 coupled via a system bus 60. The memory 30 may include a non-volatile storage medium 32 and an internal memory 30. The non-volatile storage medium 32 of the electronic device 100 has an operating system and a computer program stored thereon. The computer program is configured to implement a method for processing data provided according to any one of embodiment of the present disclosure when executed by the processor 20. The processor 20 is configured to provide computing and controlling ability to support operation of the entire electronic device 100. The internal memory 30 in the electronic device 100 provides environment for executing the computer program in the non-volatile storage medium 32. The display 40 of the electronic device 100 may be a liquid crystal display, an electronic ink display or the like. The input apparatus 50 may be a touch layer on the display 40, a keypad, a trackball or a touchpad provided on the housing of the electronic device 100, or an external keyboard, a touchpad, a mouse or the like. The electronic device 100 may be a telephone, a tablet, a personal digital assistant, a wearable device or the like. It should be understood by those skilled in the art that, the structure illustrated in FIG. 18 is merely a block diagram of a part of the electronic device related to the technical solution of the present disclosure, which is not construed to limit the electronic device 100 to which the technical solution of the present disclosure is applied. A detailed electronic device 100 may include more or fewer components than those shown in FIG. 18, or some components may be combined, or components may be arranged in a different manner.

Please refer to FIG. 4, the present disclosure further provides an electronic device 100. The electronic device 100 includes a first processing unit 110 and a second processing unit 120. The first processing unit 110 is configured to: in response to the first processing unit 110 receiving an image collection instruction sent by the second processing unit 120, turn on at least one of a floodlight 104 and a laser light 106, and operate a laser camera 102 to collect a target image; and perform processing on the target image, and send the target image processed to the second processing unit 120.

Please refer to FIG. 3 and FIG. 4. In an embodiment, the electronic device 100 includes a camera module 101, a first processing unit 110, a second processing unit 120 and a controller 130. The first processing unit 110 is coupled to the second processing unit 120 and the camera module 101 respectively. The first processing unit 110 is coupled to the controller 130 via the I2C bus. The camera module 101 includes a laser camera 101, a floodlight 104 and a laser light 106. The floodlight 104 and the laser light 106 are respectively coupled to the controller 130. The first processing unit 110 includes a PWM module 12. The first processing unit 110 is coupled to the controller 130 via the PWM module. The first processing unit 110 is further configured to: in response to receiving the image collection instruction sent by the second processing unit 120, sending a control instruction to the controller 130 via the I2C bus, the control instruction being configured to turn on the at least one of the floodlight 104 and the laser light 106; send a pulse to the controller 130 via the PWM module to illustrate the at least one of the floodlight 104 and the laser light 106 being turned up, and collect the target image via the laser camera 102; and perform processing on the target image and send the processed target image to the second processing unit 120.

Alternatively, the first processing unit 110, the controller 130 and the laser camera 102 are coupled to the same I2C bus. The first processing unit 110 is further configured to operate the laser camera 102 to collect the target image via the I2C bus. In this way, the floodlight 104, the laser light 106 and the laser camera 102 are controlled via the same I2C bus, the I2C bus may be multiplexed, the complexity for controlling the circuit may be reduced, and costs may be reduced.

Alternatively, the first processing unit 110 is further configured to: determine a type of a collected image according to the image collection instruction; send, by the first processing unit 110, a first control instruction to the controller 130 via the I2C bus when the type is a first type, the first control instruction being configured to instruct the controller 130 to turn on the floodlight 104; and send, by the first processing unit 110, a second control instruction to the controller 130 via the I2C bus when the type is a second type, the second control instruction being configured to instruct the controller 130 to turn on the laser light 106.

Alternatively, when the type includes the first type and the second type, the first processing unit 110 sends the first control instruction to the controller 130 via the I2C bus to turn on the floodlight 104; and sends the second control instruction to the controller 130 via the I2C bus to turn on the laser light 106 after the laser camera 102 collects the target image corresponding to the first type.

Alternatively, when the type includes the first type and the second type, the first processing unit 110 sends the second control instruction to the controller 130 via the I2C bus to turn on the laser light 106; and sends the first control instruction to the controller 130 via the I2C bus to turn on the floodlight 104 after the laser camera 102 collects the target image corresponding to the second type.

Alternatively, a time interval between a time point at which the first processing unit 110 sends the first control instruction and a time point at which the first processing unit 110 sends the second processing instruction is smaller than a time threshold. In this way, switching and controlling between the floodlight 104 and the laser light 106 may be implemented via one controller 130, complexity for controlling the circuit may be reduced, and the costs may be reduced.

Alternatively, the target image includes a speckle image. The first processing unit 110 is further configured to: obtain a reference speckle image stored; match the reference speckle image with the speckle image to obtain a matched result, generate a depth parallax map according to the reference depth information and the matched result, and send the depth parallax map to the second processing unit 120, the reference speckle image having reference depth information thereon. The second processing unit 120 is further configured to perform processing on the depth parallax map to obtain a depth image. In this way, the depth information of the collected image may be obtained accurately via the first processing unit 110, the efficiency for processing data is improved and the accuracy for processing the image is improved.

In this embodiment, in response to receiving the image collection instruction sent by the second processing unit 120, the first processing unit 110 sends the control instruction to the controller 130 via the I2C bus, to turn on the at least one of the floodlight 104 and the laser light 106, sends the pulse to the controller 130 via the PWM module 112 to illuminate the at least one of the floodlight 104 and the laser light 106 being turned on, performs processing on the target image after collecting the target image, and controls the floodlight 104 and the laser light 106 via one controller 130, which may reduce the complexity for controlling the floodlight 104, the laser light 106 and the like, and save costs.

Please FIG. 3 and FIG. 4. In an embodiment, the electronic device 100 includes a camera module 101, a first processing unit 110 and a second processing unit 120. The first processing unit 110 is respectively coupled to the second processing unit 120 and the camera module 101. The camera module 101 may include the laser camera 102, the floodlight 104, the laser light 106 and the like. The laser camera 102, the floodlight 104, the laser light 106 and the first processing unit 110 are coupled to the same I2C bus. The first processing unit 110 is further configured to, in response to receiving the image collection instruction sent by the second processing unit 120, turn on the at least one of the floodlight 104 and the laser light 106 via an I2C bus; operate the laser camera 102 to collect the target image via the I2C bus; process the target image, and send the processed target image to the second processing unit 120.

Alternatively, the electronic device 100 further includes a controller 130. The controller 130 is coupled to the floodlight 104 and the laser light 106 respectively. The controller 130 is configured to control the floodlight 104 and the laser light 106. The controller 130 is coupled to the I2C bus. The first processing unit 110 is further configured to determine a type of a collected image according to the image collection instruction; send a first control instruction to the controller 130 via the I2C bus when the type is an infrared image, the first control instruction being configured to instruct the controller 130 to turn on the floodlight 104; and send a second control instruction to the controller 130 via the I2C bus when the image type is a speckle image or a depth image, the second control instruction being configured to instruct the controller 130 to turn on the laser light 106.

Alternatively, the first processing unit 110 is further configured to determine a type of a collected image according to the image collection instruction; send a first control instruction to the controller 130 via the I2C bus when the type is an infrared image, the first control instruction being configured to instruct the controller 130 to turn on the floodlight 104; and send a second control instruction to the controller 130 via the I2C bus when the type is a speckle image or a depth image, the second control instruction being configured to instruct the controller 130 to turn on the laser light 106.

Alternatively, the first processing unit 110 is further configured to: when the type includes the infrared image and the speckle image, or includes the infrared image and the depth image, sending the second control instruction to the controller 130 via the I2C bus to turn on the laser light 106, operate the laser camera 102 to collect the speckle image via the I2C bus, send the first control instruction to the controller 130 via the I2C bus to turn on the floodlight 104, and operate the laser camera 102 to collect the infrared image via the I2C bus. In this way, switching and controlling between the floodlight 104 and the laser light 106 may be implemented via one controller 130, the complexity for controlling the circuit may be further reduced, and costs may be reduced.

Alternatively, the first processing unit 110 is further configured to obtain a reference speckle image stored; to match the reference speckle image with the speckle image to obtain a matched result; to generate a depth parallax map according to the reference depth information and the matched result, and to send the depth parallax map to the second processing unit 120, the reference speckle image having reference depth information thereon. The second processing unit 120 is further configured to perform processing on the depth parallax map to obtain a depth image. In this way, the depth information of the collected image may be obtained accurately via the first processing unit 110, the efficiency for processing data is improved, and the accuracy for processing the image is improved.

Alternatively, the second processing unit 120 is further configured to collect a temperature of the laser light 106 in a collection time interval, and to obtain a reference speckle image corresponding to the temperature; and to write the reference speckle image obtained at a present time to the first processing unit 110 when the reference speckle image obtained at the present time is inconsistent with the reference speckle image stored in the first processing unit 110. In this way, the reference speckle image corresponding to the temperature may be obtained according to the temperature of the laser light 106, the effects of the temperature on the depth image outputted finally may be reduced, and the obtained depth information is more accurate.

Alternatively, the second processing unit 120 is further configured to send the image collection instruction to the first processing unit 110 via a kernel on the second processing unit operating in a first operation mode. The first operation mode is a trusted execution environment. The first processing unit 110 is further configured to send the target image processed to the kernel on the second processing unit 120 operating in the first operation mode. In this way, the image collection instruction is sent to the first processing unit via the kernel with high security of the second processing unit 120, which may ensure that the first processing unit 110 is in an environment with high security, and improve the security of data.

In an embodiment, the laser camera 102, the floodlight 104, the laser light 106 and the first processing unit 110 are coupled to the same I2C bus. The first processing unit 110 controls the at least one of the floodlight 104 and the laser light 106 via the I2C bus, operates the laser camera 102 to collect the target image via the I2C bus, controls the floodlight 104, the laser light 106 and the laser camera 102 via the same I2C bus, which may multiplex the I2C bus, reduce the complexity for controlling the circuit and reduce the costs.

Please in combination with FIG. 4 and FIG. 14. In an embodiment, the electronic device 100 includes a camera module 101, a first processing unit 110 and a second processing unit 120. The first processing unit 110 is coupled to the second processing unit 120 and the camera module 101 respectively. The camera module 101 includes the laser camera 102, the floodlight 104 and the laser light 106. The floodlight 104 is coupled to a first controller 131. The laser light 106 is coupled to a second controller 132. The first processing unit 110 includes a first PWM module 1121 and a second PWM module 1122. The first processing unit 110 is coupled to the first controller 131 via the first PWM module 1121, and the first processing unit 110 is coupled to the second controller 132 via the second PWM module 1122. The first processing unit 110 is further configured to: determine a type of a collected image according to the image collection instruction in response to receiving the image collection instruction sent by the second processing unit 120; when the type is a first type, turn on the floodlight 104 in a camera module 101, send a pulse to a first controller 131 via a first PWM module 1121 to illuminate the floodlight 104, and collect a target image corresponding to the first type via the laser camera 102 in the camera module 101; when the type is a second type, turn on the laser light 106 in the camera module 101, send a pulse to a second controller 132 via a second PWM module 1122 to illuminate the laser light 106, and collect a target image corresponding to the second type via the laser camera 102 in the camera module 101; and perform processing in the target image and send the processed target image to the second processing unit 120.

Alternatively, the second processing unit 120 is coupled to the floodlight 104 and the laser light 106 respectively via an I2C bus. The second processing unit 120 is further configured to configure the floodlight 104 and the laser light 106 respectively via the I2C bus when it is detected that the camera module 101 starts up.

Alternatively, the second processing unit 120 is coupled to the floodlight 104 and the laser light 106 respectively via the same I2C bus. Or, the second processing unit 120 is coupled to the floodlight 104 via an I2C bus, and coupled to the laser light 106 via another I2C bus. In this way, the second processing unit 120 may configure the floodlight 104 and the laser light 106 via the I2C bus when the camera module 101 starts up, which may control the image collection more accurately and improve the efficiency for processing data.

Alternatively, a time point at which the first PWM module 1121 sends the pulse to the first controller 131 is different from a time point at which the second PWM module 1122 sends the pulse to the second controller 132, and a time interval between the time point at which the first PWM module 1121 sends the pulse to the first controller 131 and the time point at which the second PWM module 1122 sends the pulse to the second controller 132 is smaller than a time threshold. In this way, the first processing unit 110 may collect the infrared image and the speckle image via the laser camera 102 at different time points respectively, which may ensure that the image content of the collected infrared image is consistent with the image content of the collected speckle image and improves the accuracy of subsequent face detection.

Alternatively, the first processing unit 110 is further configured to obtain a reference speckle image stored; to match the reference speckle image with the speckle image to obtain a matched result; to generate a depth parallax map according to the reference depth information and the matched result, and to send the depth parallax map to the second processing unit 120, the reference speckle image having reference depth information thereon. The second processing unit 120 is further configured to perform processing on the depth parallax map to obtain a depth image. In this way, the depth information of the collected image may be obtained accurately via the first processing unit, the efficiency for processing data may be improved, and the accuracy for processing the image may be improved.

Alternatively, the second processing unit 120 is further configured to collect a temperature of the laser light 106 in a collection time interval, and to obtain a reference speckle image corresponding to the temperature via the second processing unit 120; and to write the reference speckle image obtained at a present time to the first processing unit 110 when the reference speckle image obtained at the present time is inconsistent with the reference speckle image stored in the first processing unit 110. In this way, the reference speckle image corresponding to the temperature may be obtained according to the temperature of the laser light 106, the effects of the temperature on the depth image outputted finally may be reduced, the obtained depth information is more accurate.

In this embodiment, in response to receiving the image collection instruction sent by the second processing unit 120, the first processing unit 110 determines the type of the image according to the image collection instruction. When the type is the first type, the first processing unit 110 illuminates the floodlight 104 via the first PWM module 1121, and collects the target image corresponding to the first type via the laser camera 102. When the type is the second type, the first processing unit 110 sends the pulse to the second controller 132 to illuminate the laser light 106 via the second PWM module 1122 and collects the target image corresponding to the second type via the laser camera 102. The floodlight 104 and the laser light 106 are controlled respectively via two PWM modules, which do not need to switch in real time, may reduce the complexity for processing data and reduce the process pressure of the first processing unit 110.

Figure 19:
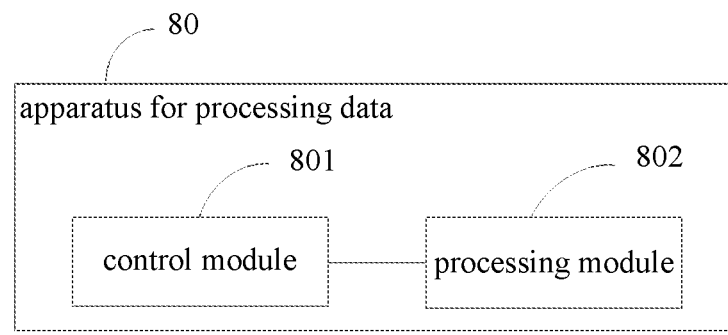
FIG. 19-FIG. 22 are block diagrams illustrating apparatuses for processing data of one or more implementations of the present disclosure.

Please refer to FIG. 4 and FIG. 19. The present disclosure provides an apparatus 80 for processing data. The apparatus 80 for processing data includes a control module 801 and a processing module 802. The control module 801 is configured to, in response to a first processing unit 110 receiving an image collection instruction sent by a second processing unit 120, turn on at least one of a floodlight 104 and a laser light 106, and operate a laser camera 102 to collect a target image. The processing module 802 is configured to perform processing on the target image via the first processing unit 110, and to send the target image processed to the second processing unit 120.

Figure 20:
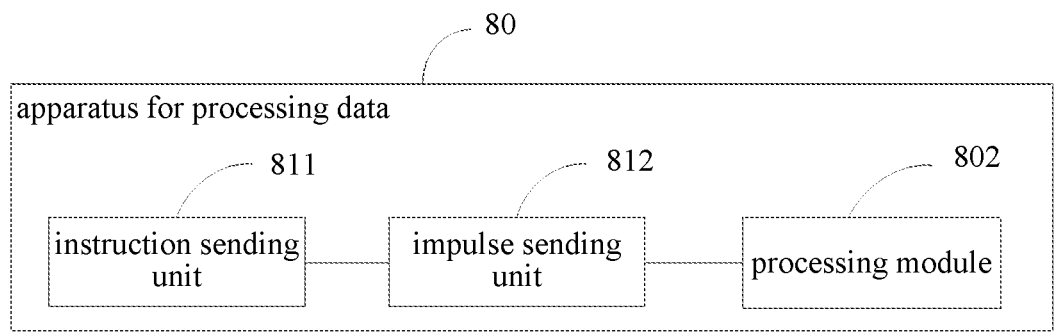

Please refer to FIG. 4, FIG. 5 and FIG. 20. In an embodiment, the control module 801 includes: an instruction sending unit 811 and a pulse sending unit 812. The instruction sending unit 811 is configured to, in response to the first processing unit 110 receiving the image collection instruction sent by the second processing unit 120, send a control instruction to a controller 130 via an I2C bus. The control instruction is configured to turn on the at least one of the floodlight 104 and the laser light 106. The pulse sending unit 812 is configured to send a pulse to the controller 130 via a PWM module 112 to illuminate the at least one of the floodlight 104 and the laser light 106 being turned up, and to collect the target image via the laser camera 102. The processing module 802 is configured to perform processing on the target image via the first processing unit 110, and to send the processed target image to the second processing unit 120.

Alternatively, the first processing unit 110, the controller 130 and the laser camera 102 are coupled to a same I2C bus. The pulse sending unit 811 is further configured to operate the laser camera 102 to collect the target image via the I2C bus. In this way, the floodlight 104, the laser light 106 and the laser camera 102 are controlled via the same I2C bus, and the I2C bus is multiplexed, which may reduce the complexity for controlling the circuit and reduce the costs.

Alternatively, the instruction sending unit 811 includes a first type determining sub-unit, a first sending sub-unit and a second sending sub-unit. The first type determining sub-unit is configured to determine a type of a collected image according to the image collection instruction. The first sending sub-unit is configured to send a first control instruction to the controller 130 via the I2C bus when the type is a first type. The first control instruction is configured to instruct the controller 130 to turn on the floodlight 104. The second sending sub-unit is configured to send a second control instruction to the controller 130 via the I2C bus when the type is a second type. The second control instruction is configured to instruct the controller 130 to turn on the laser light 106.

Alternatively, when the type includes the first type and the second type, the first sending sub-unit 110 is configured to send the first control instruction to the controller 130 via the I2C bus to turn on the floodlight 104. The second sending sub-unit is further configured to send the second control instruction to the controller 130 via the I2C bus to turn on the laser light 106 after the laser camera 102 collects a target image corresponding to the first type.

Alternatively, when the type includes the first type and the second type, the second sending sub-unit is further configured to send the second control instruction to the controller 130 via the I2C bus to turn on the laser light 106. The first sending sub-unit is further configured to send the first control instruction 110 to the controller 130 to turn on the floodlight 104 after the target image of the second type is collected via the laser camera 102.

Alternatively, a time interval between a time point at which the first processing unit sends the first control instruction and a time point at which the first processing unit sends the second processing instruction is smaller than a time threshold. In this way, switching and controlling between the floodlight 104 and the laser light 106 may be controlled via one controller 130, which may reduce the complexity for controlling the circuit and reduce costs.

Alternatively, the processing module 802 includes a first image obtaining unit, a first matching unit and a first generating unit. The first image obtaining unit is configured to obtain a reference speckle image stored. The reference speckle image has reference depth information thereon. The first matching unit is configured to match the reference speckle image with the speckle image to obtain a matched result. The first generating unit is configured to generate a depth parallax map according to the reference depth information and the matched result, and send the depth parallax map to the second processing unit 120. Processing is performed on the depth parallax map via the second processing unit 120 to obtain a depth image. In this way, the depth information of the collected image may be obtained accurately via the first processing unit 110, the efficiency for processing data may be improved, and the accuracy for processing the image may be improved.

In this embodiment, in response to receiving the image collection instruction sent by the second processing unit 120, the first processing unit 110 sends a control instruction to the controller 130 via the I2C bus, to control at least one of the floodlight 104 and the laser light 106 to be turned on, sends a pulse to the controller 130 via a PWM module 112 to illuminate the at least one of the floodlight 104 and the laser light 106 being turned on, performs processing on the target image after collecting the target image, and controls the floodlight 104 and the laser light 106 via the controller 130, which may reduce the complexity for controlling the floodlight 104, the laser light 106 and the like and save costs.

Figure 21:
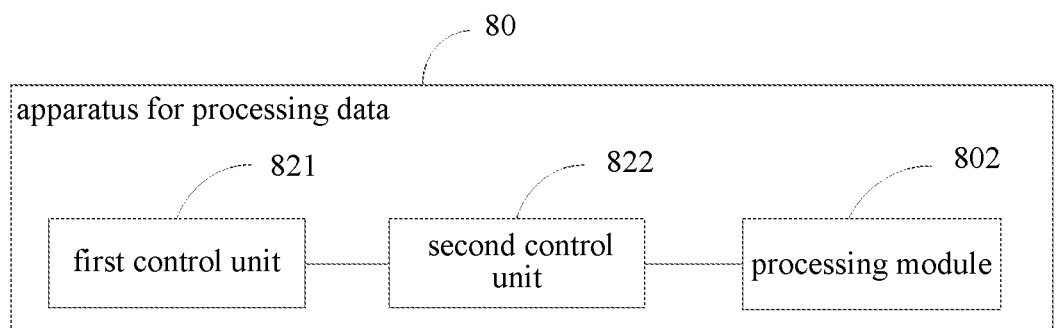

Please refer to FIG. 4 and FIG. 21. In an embodiment, the control module 81 includes a first control unit 821 and a second control unit 822. The apparatus for processing data in this embodiment is applied to an electronic device 100. The electronic device 100 includes a camera module 101, a first processing unit 110 and a second processing unit 120. The first processing unit 110 is respectively coupled to the second processing unit 120 and the camera module 101. The camera module 101 includes the laser camera 102, the floodlight 104 and the laser light 106. The laser camera 102, the floodlight 104, the laser light 106 and the first processing unit 110 are coupled to the same I2C bus. The first processing unit 821 is further configured to, in response to receiving the image collection instruction sent by the second processing unit 120, turn on the at least one of the floodlight 104 and the laser light 106 via an I2C bus. The second control unit 822 is configured to operate the laser camera 102 to collect the target image via the I2C bus. The processing unit 802 is configured to perform processing on the target image via the first processing unit 110 and to send the processed target image to the second processing unit 120.

Alternatively, the electronic device 100 further includes a controller 130. The controller 130 is configured to control the floodlight 104 and the laser light 106, and the controller 130 is coupled to the I2C bus. The first control unit 821 includes a second type determining sub-unit and an instruction sending sub-unit. The second type determining sub-unit is configured to determine a type of a collected image according to the image collection instruction. The instruction sending sub-unit is configured to send a first control instruction to the controller 130 via the I2C bus when the type is an infrared image. The first control instruction is configured to instruct the controller 130 to turn on the floodlight 104. The instruction sending sub-unit is further configured to send a second control instruction to the controller 130 via the I2C bus when the image type is a speckle image or a depth image. The second control instruction is configured to instruct the controller 130 to turn on the laser light 106.

Alternatively, the first control unit 821 is further configured to: when the type includes the infrared image and the speckle image, or includes the infrared image and the depth image, send the first control instruction to the controller 130 via the I2C bus to turn on the floodlight 104, operate the laser camera 102 to collect the infrared image via the I2C bus, send the second control instruction to the controller 130 via the I2C bus to turn on the laser light 106, and operate the laser camera 102 to collect the speckle image via the I2C bus. Or, the first control unit 821 is further configured to: when the type includes the infrared image and the speckle image, or includes the infrared image and the depth image, send the second control instruction to the controller 130 via the I2C bus to turn on the laser light 106, operate the laser camera 102 to collect the speckle image via the I2C bus, send the first control instruction to the controller 130 via the I2C bus to turn on the floodlight 104, and operate the laser camera 102 to collect the infrared image via the I2C bus. In this way, switching and controlling between the floodlight 104 and the laser light 106 may be implemented via one controller 130, which may further reduce the complexity for controlling the circuit and reduce the costs.

Alternatively, the processing module 802 includes a second image obtaining unit, a second matching unit and a second generating unit. The second image obtaining unit is configured to obtain a reference speckle image stored. The reference speckle image has reference depth information thereon. The second matching unit is configured to match the reference speckle image with the speckle image to obtain a matched result. The second generating unit is configured to generate a depth parallax map according to the reference depth information and the matched result, and to send the depth parallax map to the second processing unit 120. Processing is performed on the depth parallax map via the second processing unit to obtain a depth image. In this way, the depth information of the collected image may be obtained accurately via the first processing unit 110, the efficiency for processing data may be improved, and the accuracy for processing the image may be improved.

Alternatively, the apparatus 80 for processing data of this embodiment not only includes the control module 801 and the processing module 802, but also includes a first temperature collecting module and a first writing module. The first temperature collecting module is configured to collect a temperature of the laser light 106 in a collection time interval, and to obtain a reference speckle image corresponding to the temperature by the second processing unit 120. The first writing module is configured to write the reference speckle image obtained at a present time to the first processing unit 110 via the second processing unit 120 when the reference speckle image obtained at the present time is inconsistent with the reference speckle image stored in the first processing unit 110. In this way, the reference speckle image corresponding to the temperature may be obtained according to the temperature of the laser light 106, the effects of the temperature on the depth image outputted finally may be reduced and the obtained depth information may be more accurate.

Alternatively, the apparatus 80 for processing data in this embodiment not only includes the control module 801, the processing module 802, the first temperature collection module and the first writing module, but also includes a first sending module. The first sending module is configured to send the image collection instruction to the first processing unit 110 via a kernel on the second processing unit 120 operating in a first operation mode. The first operation mode is a trusted execution environment.

The processing module 802 is further configured to send the target image processed via the first processing unit 110 to the kernel on the second processing unit 120 operating in the first operation mode. In this way, the image collection instruction is sent to the first processing unit 110 via the kernel with high security of the second processing unit 120, which may ensure that the first processing unit is in an environment with high security and improve the security of data.

In this embodiment, the laser camera 102, the floodlight 104, the laser light 106 and the first processing unit 110 are coupled to the same I2C bus. The first processing unit 110 controls at least one of the floodlight 104 and the laser light 106 via the I2C bus, and operates the laser camera 102 to collect the target image via the I2C bus. The floodlight 104, the laser light 106 and the laser camera 102 are controlled via the same I2C bus, and the I2C bus is multiplexed, which may reduce the complexity for controlling the circuit and save costs.

Figure 22:
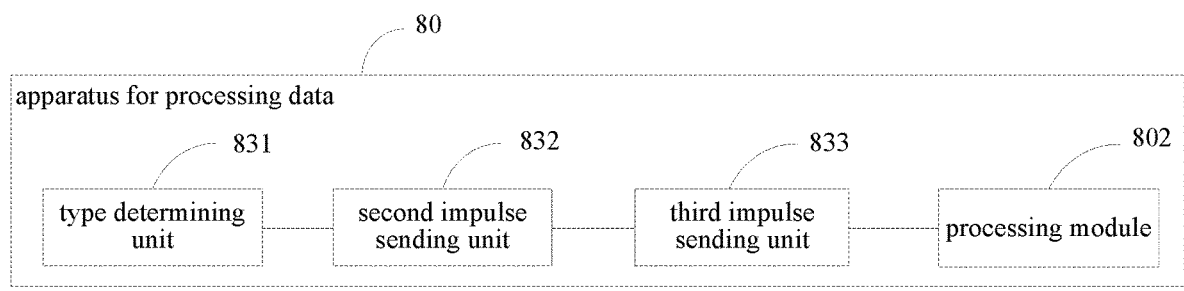

Please refer to FIG. 4, FIG. 14 and FIG. 22. In an embodiment, the control module 801 includes a type determining unit 831, a second pulse sending unit 832 and a third pulse sending unit 833. The type determining unit 831 is configured to determine a type of a collected image according to the image collection instruction in response to the first processing unit 110 receiving the image collection instruction sent by the second processing unit 120. The second pulse sending unit 832 is configured to: when the type is a first type, turn on the floodlight 104 in a camera module 101, send a pulse to a first controller 131 via a first PWM module 1121 to illuminate the floodlight 104, and collect a target image corresponding to the first type via the laser camera 102 in the camera module 101. The third pulse sending unit 833 is configured to: when the type is a second type, turn on the laser light 106 in the camera module 101, send a pulse to a second controller 132 via a second PWM module 1122 to illuminate the laser light 106, and collect a target image corresponding to the second type via the laser camera 102 in the camera module 101. The processing module 802 is configured to perform processing on the target image via the first processing unit 110 and to send the processed target image to the second processing unit.

In this embodiment, a type of a collected image is determined according to the image collection instruction when the first processing unit 110 receives the image collection instruction sent by the second processing unit 120. When the type is a first type, the first processing unit 110 illuminates the floodlight 104 via the first PWM module 1121, and collects a target image corresponding to the first type via the laser camera 102. When the type is a second type, the first processing unit sends the pulse to the second controller 132 to illuminate the laser light 106 via the second PWM module 1122, and collects a target image corresponding to the second type via the laser camera 102. The floodlight 104 and the laser light 106 are respectively controlled via two PWM modules, which does not need to switch in real time, reduces the complexity for processing data and reduces the processing pressure of the first processing unit 110.

Alternatively, the second processing unit 120 is coupled to the floodlight 104 and the laser light 106 respectively via an I2C bus. The apparatus 80 for processing data in this embodiment not only includes the control module 801 and the processing unit 802, but also includes a configuring module. The configuring module is configured to configure the floodlight 104 and the laser light 106 respectively via the I2C bus when it is detected that the camera module 101 is activated.

Alternatively, the second processing unit 120 is coupled to the floodlight 104 and the laser light 106 respectively via the same I2C bus. Or, the second processing unit 120 is coupled to the floodlight 104 via an I2C bus, and coupled to the laser light 106 via another I2C bus. In this way, the second processing unit 120 may configure the floodlight 104 and the laser light 106 via the I2C bus when the camera module 101 is activated, which may operate to collect the image more accurately and improve the efficiency for processing data.

Alternatively, a time point at which the first PWM module 1121 sends the pulse to the first controller 131 is different from a time point at which the second PWM module 1122 sends the pulse to the second controller 132, and a time interval between the time point at which the first PWM module 1121 sends the pulse to the first controller 131 and the time point at which the second PWM module 1122 sends the pulse to the second controller 132 is smaller than a time threshold. In this way, the first processing unit 110 may collect an infrared image and a speckle image at different time points via the laser camera 102, which may ensure that the image content of the collected infrared image is consistent with the image content of the collected speckle image and improve the accuracy for subsequent face detection.

Alternatively, the processing unit 802 includes a third image obtaining unit, a third matching unit and a third generating unit. The third image obtaining unit is configured to obtain a reference speckle image stored. The reference speckle image has reference depth information thereon. The third matching unit is configured to match the reference speckle image with the speckle image to obtain a matched result. The third generating unit is configured to generate a depth parallax map according to the reference depth information and the matched result, and to send the depth parallax map to the second processing unit 120. Processing is performed on the depth parallax map via the second processing unit 120 to obtain a depth image. In this way, the depth information of the collected image may be obtained accurately via the first processing unit 110, the efficiency for processing data may be improved and the accuracy for processing the image may be improved.

Alternatively, the apparatus 80 for processing data in this embodiment not only includes the control module 801, the processing module 802 and the configuring module, but also includes a second temperature collecting module and a second writing module.

The second temperature collecting module is configured to collect a temperature of the laser light 106 in a collection time interval, and to obtain a reference speckle image corresponding to the temperature via the second processing unit 120. The second writing module is configured to write the reference speckle image obtained at a present time to the first processing unit 110 via the second processing unit 120 when the reference speckle image obtained at the present time is inconsistent with the reference speckle image stored in the first processing unit 110. In this way, the reference speckle image corresponding to the temperature may be obtained according to the laser light 106, which may reduce the effects of the temperature on the depth image outputted finally and enable the depth information more accurately.

The present disclosure further provides a computer readable storage medium having a computer program stored thereon. The computer program is configured to implement the method for processing data according to any one of embodiments described above when executed by a processor.

The present disclosure further provides a computer program product including a computer program. When the computer program is operated in a computer device, the computed device is caused to implement the method for processing data according to any one of embodiments described above.

Those skilled in the art can understand that all or some steps in the above embodiments may be completed by relevant hardware instructed by a computer program. The program may be stored in a non-volatile computer readable storage medium. The program may include procedures of embodiments of each method described above when being executed. The storage medium may be a magnetic disk, a compact disk-read only memory (CD-ROM), a read-only memory (ROM) and the like.

Any reference to a memory, a storage medium, a database or other medium as used herein may include non-volatile and/or volatile memory. A suitable non-volatile memory can include a ROM, a programmable read-only memory (PROM), an electrically programmable read-only memory (EPROM), an electrically erasable programmable read-only memory (EEPROM), or a flash memory. The volatile memory can include a random access memory (RAM) which may act as an external cache memory. By way of illustration and not limitation, the RAM is available in many forms such as a static RAM (SRAM), a dynamic RAM (DRAM), a synchronous DRAM (S DRAM), a dual data rate SDRAM (DDR SDRAM), an enhanced SDRAM (ES-DRAM), a synchlink DRAM (SLDRAM), a direct Rambus RAM (DRRAM), a direct Rambus dynamic RAM (DRDRAM) and a Rambus dynamic RAM (RDRAM).

The technical features of the above embodiments may be combined in any manner. For a clear and detailed description, all possible combinations of the various technical features in the above embodiments are not described. However, as long as there is no contradiction in the combination of these technical features, it should be considered as within the scope of the present disclosure.

The above embodiments only express several implementations of the present application, and their description is relatively specific and detailed, but it cannot be interpreted as the limitation to the scope of the present application. It should be pointed out that for ordinary technical personnel in this field, certain deformation and improvement can be made under the premise of not deviating from the concept of the present application, which all belong to the protection scope of the present application. Therefore, the protection scope of the present application shall be subject to the attached claims.

What is claimed is:

1. A method for processing data, comprising:
    turning on at least one of a floodlight or a laser light, and operating a laser camera to collect a target image in response to a first processing unit receiving an image collection instruction sent by a second processing unit, comprising:
        sending a control instruction to a controller via an inter-integrated circuit (I2C) bus in response to the first processing unit receiving the image collection instruction sent by the second processing unit, the control instruction being configured to turn on the at least one of the floodlight or the laser light and
        sending a pulse to the controller via a pulse width modulation (PWM) module to illustrate the at least one of the floodlight and the laser light being turned up, and collecting the target image via the laser camera; and
    performing processing on the target image via the first processing unit, and sending the target image processed to the second processing unit.

2. The method of claim 1, wherein, the first processing unit, the controller and the laser camera are coupled to the same I2C bus; and collecting the target image via the laser camera comprises:
    operating the laser camera to collect the target image via the I2C bus.

3. The method of claim 2, wherein, sending the control instruction to the controller via the I2C bus comprises:
    determining a type of a collected image according to the image collection instruction;
    sending, by the first processing unit, a first control instruction to the controller via the I2C bus when the type is a first type, the first control instruction being configured to instruct the controller to turn on the floodlight; and
    sending, by the first processing unit, a second control instruction to the controller via the I2C bus when the type is a second type, the second control instruction being configured to instruct the controller to turn on the laser light.

4. The method of claim 3, further comprising:
    after determining the type of the collected image according to the image collection instruction:
    when the type comprises the first type and the second type, sending, by the first processing unit, the first control instruction to the controller via the I2C bus, to turn on the floodlight; and
    after the laser camera collects a target image corresponding to the first type, sending the second control instruction to the controller via the I2C bus, to turn on the laser light,
    in which a time interval between a time point at which the first processing unit sends the first control instruction and a time point at which the first processing unit sends the second control instruction is smaller than a time threshold.

5. The method of claim 3, further comprising:
    after determining the type of the collected image according to the image collection instruction:
    when the type comprises the first type and the second type, sending, by the first processing unit, the second control instruction to the controller via the I2C bus, to turn on the laser light; and
    after the laser camera collects a target image corresponding to the second type, sending the first control instruction to the controller via the I2C bus, to turn on the floodlight,
    in which a time interval between a time point at which the first processing unit sends the first control instruction and a time point at which the first processing unit sends the second control instruction is smaller than a time threshold.

6. The method of claim 1, wherein, the target image comprises a speckle image; and performing the processing on the target image via the first processing unit and sending the target image processed to the second processing unit comprise:
    obtaining a reference speckle image stored, the reference speckle image having reference depth information thereon;
    matching the reference speckle image with the speckle image, to obtain a matched result; and
    generating a depth parallax map according to the reference depth information and the matched result, sending the depth parallax map to the second processing unit, and performing processing on the depth parallax map via the second processing unit to obtain a depth image.

7. The method of claim 1, applied to an electronic device, wherein, the electronic device comprises a camera module, the first processing unit and the second processing unit, and the first processing unit is coupled to the second processing unit and the camera module respectively; the camera module comprises the laser camera, the floodlight and the laser light, in which the laser camera, the floodlight, the laser light and the first processing unit are coupled to the same I2C bus; and turning on at least one of the floodlight and the laser light and operating the laser camera to collect the target image in response to the first processing unit receiving the image collection instruction sent by the second processing unit comprise:

in response to the first processing unit receiving the image collection instruction sent by the second processing unit, operating the at least one of the floodlight and the laser light to be turned on via an I2C bus; and operating, by the first processing unit, the laser camera to collect the target image via the I2C bus.

8. The method of claim 7, wherein, the electronic device further comprises a controller, the controller is configured to control the floodlight and the laser light, the controller is coupled to the I2C bus; and controlling the at least one of the floodlight and the laser light to be turned on via the I2C bus comprises:

determining a type of a collected image according to the image collection instruction;

sending, by the first processing unit, a first control instruction to the controller via the I2C bus when the type is an infrared image, the first control instruction being configured to instruct the controller to turn on the floodlight; and sending, by the first processing unit, a second control instruction to the controller via the I2C bus when the type is a speckle image or a depth image, the second control instruction being configured to instruct the controller to turn on the laser light.

9. The method of claim 8, further comprising:

when the type comprises the infrared image and the speckle image, or comprises the infrared image and the depth image, sending, by the first processing unit, the first control instruction to the controller via the I2C bus to turn on the floodlight, operating the laser camera to collect the infrared image via the I2C bus, sending the second control instruction to the controller via the I2C bus to turn on the laser light, and operating the laser camera to collect the speckle image via the I2C bus.

10. The method of claim 8, further comprising:

when the type comprises the infrared image and the speckle image, or comprises the infrared image and the depth image, sending, by the first processing unit, the second control instruction to the controller via the I2C bus to turn on the laser light, operating the laser camera to collect the speckle image via the I2C bus, sending the first control instruction to the controller via the I2C bus to turn on the floodlight, and operating the laser camera to collect the infrared image via the I2C bus.

11. The method of claim 7, wherein, the target image comprises a speckle image;

and performing the processing on the target image via the first processing unit and sending the target image processed to the second processing unit comprise:

obtaining a reference speckle image stored, the reference speckle image having reference depth information thereon;

matching the reference speckle image with the speckle image, to obtain a matched result; and generating a depth parallax map according to the reference depth information and the matched result, sending the depth parallax map to the second processing unit, and performing processing on the depth parallax map via the second processing unit to obtain a depth image.

12. The method of claim 11, further comprising:

before obtaining the reference speckle image stored:

collecting a temperature of the laser light in a collection time interval, and obtaining a reference speckle image corresponding to the temperature by the second processing unit; and writing the reference speckle image obtained at a present time to the first processing unit via the second processing unit when the reference speckle image obtained at the present time is inconsistent with the reference speckle image stored in the first processing unit.

13. The method of claim 7, wherein the method further comprises:

before turning on at least one of the floodlight or the laser light, and operating the laser camera to collect the target image in response to the first processing unit receiving the image collection instruction sent by the second processing unit:

sending the image collection instruction to the first processing unit via a kernel on the second processing unit operating in a first operation mode, the first operation mode being a trusted execution environment; and sending the target image processed to the second processing unit comprises:

sending, by the first processing unit, the target image processed to the kernel on the second processing unit operating in the first operation mode.

14. The method of claim 1, wherein, turning on at least one of the floodlight or the laser light, and operating the laser camera to collect the target image in response to the first processing unit receiving the image collection instruction sent by the second processing unit comprise:

determining a type of a collected image according to the image collection instruction when the first processing unit receives the image collection instruction sent by the second processing unit;

when the type is a first type, turning on the floodlight in a camera module, sending a pulse to a first controller via a first PWM module to illuminate the floodlight, and collecting a target image corresponding to the first type via the laser camera in the camera module; and when the type is a second type, turning on the laser light in the camera module, sending a pulse to a second controller via a second PWM module to illuminate the laser light, and collecting a target image corresponding to the second type via the laser camera in the camera module.

15. The method of claim 14, wherein, the second processing unit is coupled to the floodlight and the laser light respectively via an I2C bus; and the method further comprises:

before determining the type according to the image collection instruction in response to the first processing unit receiving the image collection instruction sent by the second processing unit, configuring, by the second processing unit, the floodlight and the laser light respectively via the I2C bus in response to detecting that the camera module starts up, in which the second processing unit is coupled to the floodlight and the laser light via one or two I2C buses.

16. The method of claim 14, wherein, the target image comprises a speckle image;

and performing the processing on the target image via the first processing unit and sending the target image processed to the second processing unit comprise:

obtaining a reference speckle image stored, the reference speckle image having reference depth information thereon;

matching the reference speckle image with the speckle image, to obtain a matched result; and generating a depth parallax map according to the reference depth information and the matched result, sending the depth parallax map to the second processing unit, and performing processing on the depth parallax map via the second processing unit to obtain a depth image.

17. The method of claim 16, further comprising:

before obtaining the reference speckle image stored:

collecting a temperature of the laser light in a collection time interval, and obtaining a reference speckle image corresponding to the temperature via the second processing unit; and writing the reference speckle image obtained at a present time to the first processing unit via the second processing unit when the reference speckle image obtained at the present time is inconsistent with the reference speckle image stored in the first processing unit.

18. An apparatus for processing data, comprising:

one or more processors, a memory storing instructions executable by the one or more processors, wherein the one or more processors are configured to:

turn on at least one of a floodlight or a laser light, and operate a laser camera to collect a target image in response to a first processing unit receiving an image collection instruction sent by a second processing unit, comprising:

send a control instruction to a controller via an inter-integrated circuit (I2C) bus in response to the first processing unit receiving the image collection instruction sent by the second processing unit, the control instruction being configured to turn on the at least one of the floodlight or the laser light; and send a pulse to the controller via a pulse width modulation (PWM) module to illustrate the at least one of the floodlight and the laser light being turned up, and collecting the target image via the laser camera; and perform processing on the target image via the first processing unit, and send the target image processed to the second processing unit.

19. A non-transitory computer readable storage medium having a computer program stored thereon, wherein, the computer program is configured to implement a method for processing data, in which the method comprises:

turning on at least one of a floodlight or a laser light, and operating a laser camera to collect a target image in response to a first processing unit receiving an image collection instruction sent by a second processing unit, comprising:

sending a control instruction to a controller via an inter-integrated circuit (I2C) bus in response to the first processing unit receiving the image collection instruction sent by the second processing unit, the control instruction being configured to turn on the at least one of the floodlight or the laser light; and sending a pulse to the controller via a pulse width modulation (PWM) module to illustrate the at least one of the floodlight and the laser light being turned up, and collecting the target image via the laser camera; and performing processing on the target image via the first processing unit, and sending the target image processed to the second processing unit.

* * * * *